United States Patent
Liu et al.

(10) Patent No.: US 8,468,471 B2
(45) Date of Patent: Jun. 18, 2013

(54) PROCESS AWARE METROLOGY

(75) Inventors: Xuefeng Liu, San Jose, CA (US); Yung-Ho Alex Chuang, Cupertino, CA (US); John Fielden, Los Altos, CA (US); Bin-Ming Benjamin Tsai, Saratoga, CA (US); Jingjing Zhang, San Jose, CA (US)

(73) Assignee: KLA-Tencor Corp., Milpitas, CA (US)

( * ) Notice: Subject to any disclaimer, the term of this patent is extended or adjusted under 35 U.S.C. 154(b) by 0 days.

(21) Appl. No.: 13/411,433

(22) Filed: Mar. 2, 2012

(65) Prior Publication Data
US 2013/0080984 A1 Mar. 28, 2013

Related U.S. Application Data

(60) Provisional application No. 61/538,699, filed on Sep. 23, 2011.

(51) Int. Cl.
*G06F 19/00* (2011.01)
*G06F 17/50* (2006.01)

(52) U.S. Cl.
CPC ............ *G06F 17/5081* (2013.01); *G06F 19/00* (2013.01)
USPC .................. 716/54; 716/52; 716/53; 716/55; 716/136; 700/110; 700/120; 700/121

(58) Field of Classification Search
CPC .................................................. G06F 17/5081
USPC ................. 716/54, 52, 53, 55, 136; 700/110, 700/120, 121
See application file for complete search history.

(56) References Cited

U.S. PATENT DOCUMENTS

| | | |
|---|---|---|
| 4,710,642 A | 12/1987 | McNeil et al. |
| 5,241,369 A | 8/1993 | McNeil et al. |
| 5,607,800 A | 3/1997 | Ziger |
| 5,608,526 A | 3/1997 | Piwonka-Corle et al. |
| 5,703,692 A | 12/1997 | McNeil et al. |
| 5,739,909 A | 4/1998 | Blayo et al. |
| 5,867,276 A | 2/1999 | McNeil et al. |
| 5,880,838 A | 3/1999 | Marx et al. |
| 5,963,329 A | 10/1999 | Conrad et al. |
| 6,104,486 A | 8/2000 | Arimoto |
| 6,278,519 B1 | 8/2001 | Rosencwaig et al. |
| 6,429,943 B1 | 8/2002 | Opsal et al. |
| 6,483,580 B1 | 11/2002 | Xu et al. |
| 6,608,690 B2 | 8/2003 | Niu et al. |
| 6,611,330 B2 | 8/2003 | Lee et al. |
| 6,678,046 B2 | 1/2004 | Opsal |
| 6,734,967 B1 | 5/2004 | Piwonka-Corle et al. |
| 6,813,034 B2 | 11/2004 | Rosencwaig et al. |

(Continued)

FOREIGN PATENT DOCUMENTS

JP 2008242112 A * 10/2008
KR 10-2003-0071575 9/2003

OTHER PUBLICATIONS

Arimoto, "Precise Line-and-Space Monitoring Results by Ellipsometry," Japn. J. Appl. Phys. 36, 173-175 (1997).

(Continued)

*Primary Examiner* — Phallaka Kik
(74) *Attorney, Agent, or Firm* — Ann Marie Mewherter

(57) ABSTRACT

Systems and methods for process aware metrology are provided.

23 Claims, 17 Drawing Sheets

U.S. PATENT DOCUMENTS

| | | |
|---|---|---|
| 6,891,627 B1 | 5/2005 | Levy et al. |
| 7,038,850 B2 | 5/2006 | Chang et al. |
| 7,092,110 B2 | 8/2006 | Balasubramanian et al. |
| 7,106,459 B2 | 9/2006 | Chu |
| 7,126,700 B2 | 10/2006 | Bao et al. |
| 7,171,284 B2 | 1/2007 | Vuong et al. |
| 7,190,453 B1 | 3/2007 | Aoyagi et al. |
| 7,206,070 B2 | 4/2007 | Opsal |
| 7,215,431 B2 | 5/2007 | Opsal |
| 7,280,229 B2 | 10/2007 | Li et al. |
| 7,312,881 B2 | 12/2007 | Shchegrov et al. |
| 7,327,475 B1 | 2/2008 | Chu et al. |
| 7,478,019 B2 | 1/2009 | Zangooie et al. |
| 7,716,023 B2 * | 5/2010 | Barker et al. ............... 703/2 |
| 7,831,528 B2 | 11/2010 | Doddi et al. |
| 7,859,659 B2 | 12/2010 | Xu et al. |
| 8,001,512 B1 * | 8/2011 | White ............... 716/119 |
| 8,090,558 B1 | 1/2012 | Dziura |
| 8,196,068 B2 * | 6/2012 | Zhang ............... 716/53 |
| 8,209,161 B2 * | 6/2012 | Zhu ............... 703/13 |
| 2004/0013950 A1 * | 1/2004 | Kang et al. ............... 430/5 |
| 2004/0181768 A1 | 9/2004 | Krukar |
| 2006/0062445 A1 | 3/2006 | Verma et al. |
| 2006/0132806 A1 | 6/2006 | Shchegrov et al. |
| 2006/0161452 A1 * | 7/2006 | Hess ............... 705/1 |
| 2006/0236294 A1 * | 10/2006 | Saidin et al. ............... 716/19 |
| 2008/0072207 A1 * | 3/2008 | Verma et al. ............... 716/21 |
| 2009/0024967 A1 | 1/2009 | Su et al. |
| 2010/0122225 A1 * | 5/2010 | Cao et al. ............... 716/4 |
| 2012/0017183 A1 * | 1/2012 | Ye et al. ............... 716/52 |
| 2012/0293197 A1 * | 11/2012 | Joshi et al. ............... 324/762.03 |

OTHER PUBLICATIONS

Blayo et al., "Ultraviolet-visible ellipsometry for process control during etching of submicrometer features," J. Opt. Soc. Am. A, 12, 591-599 (1995).

Mills et al., "Spectral ellipsometry on patterned wafers," Proceeding of SPIE "Process, Equipment, and Material Control in Integrated Circuit Manufacturing," Sabnis and Raaijmakers, eds., 2637, 194-203 (Oct. 25-26, 1995).

U.S. Appl. No. 12/841,932 to Ferns et al., filed Jul. 22, 2010.

U.S. Appl. No. 13/164,398 by Dziura et al., filed Jun. 20, 2011.

U.S. Appl. No. 61/555,108 to Yoo et al. filed Nov. 3, 2011.

International Search Report and Written Opinion for PCT/US2012/056272 mailed Mar. 4, 2013.

* cited by examiner $$\text{mean}(d) = \frac{\sum_i d_i \Delta L_i}{L} \qquad \text{variance}(d) = \sqrt{\frac{\sum_i (d_i - \text{mean}(d))^2 \Delta L_i}{L}}$$

PROCESS AWARE METROLOGY

CROSS-REFERENCE TO RELATED APPLICATIONS

This application claims priority to U.S. Provisional Application No. 61/538,699 tied "Process Aware CD Metrology," filed Sep. 23, 2011, which is incorporated by reference as if fully set forth herein.

BACKGROUND OF THE INVENTION

1. Field of the Invention

This invention generally relates to systems and methods for inspecting and measuring structures created during the fabrication of semiconductor devices.

2. Description of the Related Art

The following description and examples are not admitted to be prior art by virtue of their inclusion in this section.

The semiconductor industry has been using optical critical dimension (CD) metrology (such as scatterometry) since about 2000, but many of the current uses in high-volume manufacturing are limited to measurement of relatively simple shapes, usually just a grid of parallel trenches or structures, and measurement of relatively few shape parameters such as height (depth), CD (width) and sidewall angle.

In order to make a measurement, a model of the structure has to be constructed. Usually cross-section electron micrographs of the structure are needed because, in most cases, the shapes cannot be determined from top-down images. If the shape of the structure is three-dimensional (i.e. the structure does not have a constant cross-section any direction), then at least two perpendicular cross-sections may be needed to reveal the shape.

A model is most often constructed from simple geometric shapes that approximate the shape of the structure. The dimensions of these shapes are controlled by a few parameters (such as length, width, height and/or angles). When setting up the model, a decision has to be made as to which of these dimensional parameters will be allowed to vary during the measurement process and which will be kept constant.

Values or models of the complex refractive indices of the materials that make up the structure are needed. In many cases, these will be known from prior experience with these materials or by measurements at unpatterned locations on the same wafer or from other wafers processed through the same, or similar, equipment and processes.

Once the shapes, dimensions and refractive indices are known, electromagnetic calculations can predict how light will scatter from that structure. Those scattering predictions can be used to model the expected signal when an optical instrument makes a measurement of that structure.

The complete model (sometimes referred as a measurement recipe) is then used to process data collected on an optical measuring tool such as a reflectometer or ellipsometer in order to determine the best fitting shape parameters, which are assumed to represent the relevant dimensions of the actual shape.

In many cases, the model may be used to precompute a library of optical signatures corresponding to ranges of all the dimensional parameters that are allowed to vary. A library may speed up the measurement significantly when more than 2 or 3 parameters are allowed to vary.

It is also known to construct libraries of optical signatures from experimentally measured optical signatures collected by measuring structures on wafers that were processed under different conditions. In some cases, other measurement techniques, such as SEM images, are used also to determine some of the dimensions.

The need for cross-section images means that an accurate model cannot be constructed for many hours or even days after the first wafers have been processed because of the time needed to prepare the wafers for cross-sectioning as well as the time required for taking the images. This delay is generally not acceptable, and the cost is high. Often initial measurements have to be made using models constructed before cross-section images are available and so those models incorporate a lot of guesswork and may in not provide accurate measurements for the structure. If the results subsequently prove to be accurate, until the cross-section images become available, there may be a lack of confidence in the results leading to delays in acting upon those results.

Two perpendicular cross-section images plus a top-down image may not suffice to reveal all the details of complex structures made from multiple materials. Re-entrant features, in particular, may be missed unless a cross-section happens to go through the right location.

Since cross-sections are slow and expensive to prepare, typically only a few will be prepared. These will not show all the possible variations in shapes and dimensions that can occur with normal variations in processing, let alone the changes that may occur when abnormal situations arise.

As described above, the dimensions of the geometric shapes that make up the model are controlled by a set of parameters (such as length(s), width(s), height(s) and/or angles). When setting up the recipe, decisions have to be made which dimensional parameters should be kept fixed and which should be allowed to vary during the measurement process. If many, or all, parameters are allowed to vary in an attempt to maximize the flexibility of the model to track process changes, the measurement results will usually exhibit poor repeatability (and for 20 or more parameters may be unstable) because the optical signal may poorly discriminate between certain combinations of dimensional changes. But if one or more parameters are held constant when the corresponding dimensions are actually varying, then the measurement results will be inaccurate.

The process of constructing the model of the structure involves a combination of experience, guesswork and trial and error and is, at best, a stow process that is not consistent from person to person, and, at worst, may not result in an accurate measurement.

When a library is constructed from experimental data, the library cannot be constructed until multiple wafers have been fully processed under different process conditions and the optical measurements have been performed on those wafers. Such a library suffers from the disadvantages of being noisy. Firstly, there is process noise because, even for the same process settings on the process tool, the actual processing conditions do vary with location on the wafer and from wafer to wafer. Secondly, there is necessarily noise on the optical measurements from optical, thermal and electrical noise sources in the instrument. Thirdly, any reference dimensional or shape measurements (from, for example an electron micrograph or an atomic force microscope) are also subject to noise and systematic errors.

Accordingly, it would be advantageous to develop process aware metrology systems and/or methods that do not have one or more of the disadvantages described above.

SUMMARY OF THE INVENTION

The following description of various embodiments is not to be construed in any way as limiting the subject matter of the appended claims.

One embodiment relates to a computer-implemented method for generating an optical model of a structure to be measured on a semiconductor wafer. The method includes selecting nominal values and one or more different values of process parameters for one or more process steps used to form the structure on the wafer. The method also includes simulating one or more characteristics of the structure that would be formed on the wafer using the nominal values. In addition, the method includes generating an initial model of the structure based on results of the simulating step. The method further includes simulating the one or more characteristics of the structure that would be formed on the wafer using the one or more different values as input to the initial model. The method also includes translating results of both of the simulating steps into the optical model of the structure. In addition, the method includes determining parameterization of the optical model based on how the one or more characteristics of the structure vary between at least two of the nominal values and the one or more different values. The selecting step, both simulating steps, the generating step, the translating step, and the determining step are performed without using images of the structure as formed on a wafer and may be started before the structure is formed on any wafers. The selecting step, both simulating steps, the generating step, the translating step, and the determining step are performed using a computer system.

Each of the steps of the method described above may be further performed as described herein. In addition, each of the steps of the method may be performed using any of the system(s) described herein. Furthermore, the method may include any other step(s) described herein.

Another embodiment relates to a non-transitory computer-readable medium storing program instructions executable on a computer system for performing a computer-implemented method for generating an optical model of a structure to be measured on a semiconductor wafer. The computer-implemented method executable by the program instructions includes the steps of the above-described computer-implemented method. The computer-readable medium may be further configured as described herein.

An additional embodiment relates to a system configured to generate an optical model of a structure to be measured on a semiconductor wafer. The system includes an optical measurement subsystem configured to measure the structure as formed on the wafer. The system also includes a computer subsystem configured for performing the steps of the computer-implemented method described above. The system may be further configured as described herein.

BRIEF DESCRIPTION OF THE DRAWINGS

Other objects and advantages of the invention will become apparent upon reading the following detailed description and upon reference to the accompanying drawings in which.

Figure 1:
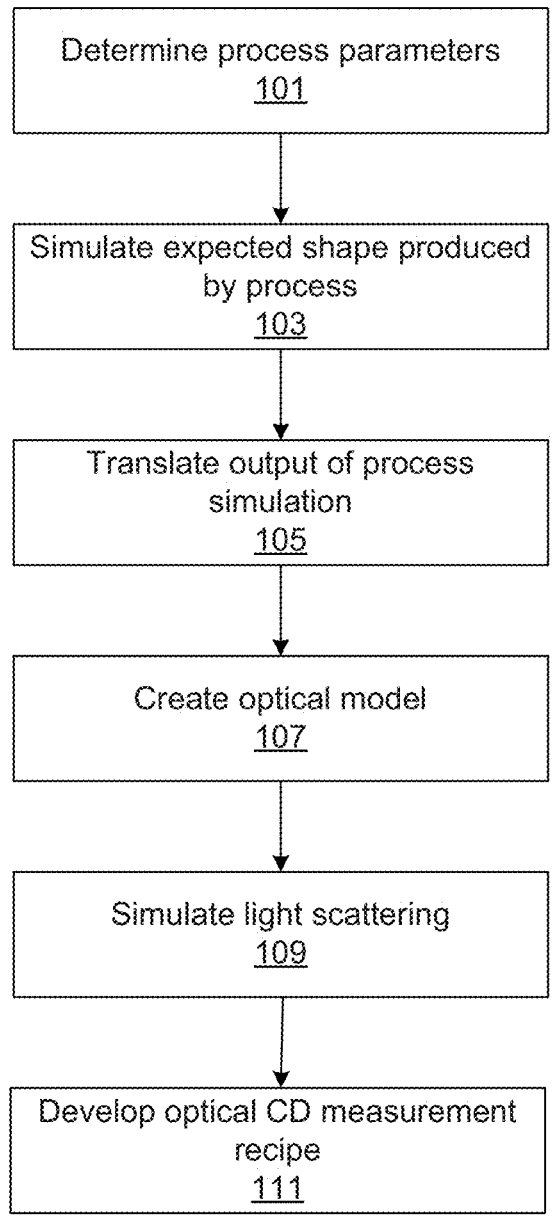
FIG. 1 is a flow chart illustrating one embodiment of a simulation and model development process.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals.

The embodiments described herein enable optical measurement of the shapes of structures created by lithography and etching, provide quantitative information to allow adjustment of the processing conditions of subsequent wafers, and can be used to determine whether the dimensions of the structures are within preset control limits. The embodiments described herein also enable designing structures that facilitate optical measurements and simplifying and speeding up the development of optical models and measurement recipes.

One embodiment relates to a computer-implemented method for generating an optical model of a structure to be measured on a semiconductor wafer. FIG. 1 illustrates one embodiment of a method for the simulation and model development. The method includes selecting nominal values and one or more different values of process parameters for one or more process steps used to form the structure on the wafer. The one or more process steps may include any process steps involved in manufacturing of the wafer. For example, as shown in FIG. 1, the method includes determining process parameters, as shown in step 101. The process parameters can be determined in any suitable manner (e.g., from a fab database). The values for the process parameters may include nominal values and some variations of the values from nominal.

The method includes simulating one or more characteristics of the structure that would be formed on the wafer using the nominal values. For example, the method includes simulating the expected shape produced by the process, as shown in step 103. Simulating the expected shape can be performed using the ATHENA and VICTORY Process software packages sold by Silvaco, Inc. of Santa Clara, Calif. to predict the shapes of semiconductor structures created by deposition, lithography and etch under the process parameters.

The method also includes generating an initial model of the structure based on results of the simulating step. For example, the predicted shape of a structure under nominal process conditions can be used as the nominal shape of the structure for the initial model, thus allowing models to be developed without waiting for images of structures. In this manner, once the process conditions have been set, models can be developed even before wafers are processed.

The method further includes simulating the one or more characteristics of the structure that would be formed on the wafer using the one or more different values as input to the initial model. For example, process simulation software such as the ATHENA and VICTORY Process software packages can be used to predict how the shapes of semiconductor structures created by deposition, lithography and etch can vary under different process conditions. In addition, the method includes translating results of both of the simulating steps into the optical model of the structure. For example as shown in step 105, the method may include translating the output of process simulation. In addition, as shown in step 107, the method may include creating an optical model.

The method also includes determining parameterization of the optical model based on how the one or more characteristics of the structure vary between at least two of the nominal values and the one or more different values. For example, the insight gained into how the shape may vary under different process conditions can guide the parameterization of the model. In one example, as etch time is increased, the curvature and slope of the side wall may both vary. In one embodiment, determining the parameterization includes selecting parameters that are included in the optical model. In another embodiment, determining the parameterization includes determining parameters of the optical model that are allowed to vary. For example, if the mathematical model that describes the side wall can be constructed using fewer parameters when constrained to the shapes that the process can produce, then fewer parameters need to be allowed to vary when making the measurement resulting in better measurement repeatability and accuracy than a model with more parameters and/or poorly chosen parameters.

The selecting step, both simulating steps, the generating step, the translating step, and the determining step may be performed without using images of the structure as formed on a wafer and before the structure is formed on any wafers. For example, the predicted shape of a structure under nominal process conditions can be used as the nominal shape of the structure for the initial model, thus allowing models to be developed without waiting for images of structures. Once the process conditions have been set, models can be developed even before wafers are processed.

The selecting step, both simulating steps, the generating step, the translating step, and the determining step are performed using a computer system. The computer system may perform the steps as described further herein.

As shown in FIG. 1, the method may also include simulating light scattering, as shown in step 109, and developing an optical critical dimension (CD) measurement recipe, as shown in step 111, both of which may be performed as described further herein.

Figure 2:
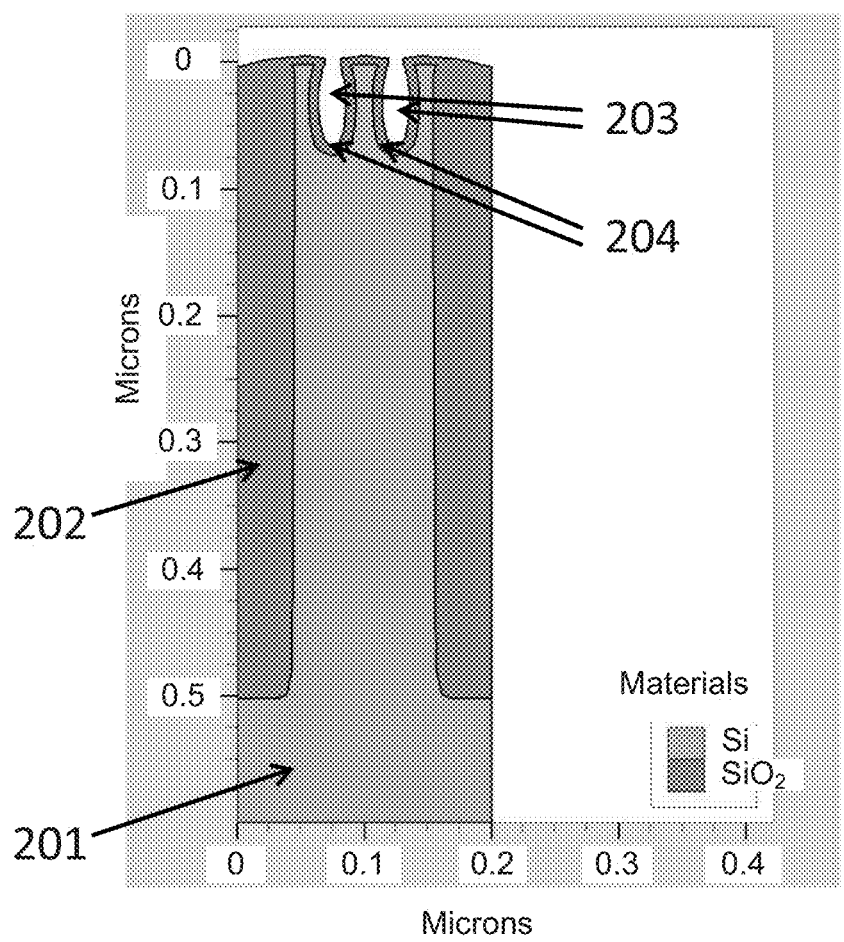
FIG. 2 is a schematic diagram illustrating a cross-sectional view of one example of a structure created by etching and deposition.

FIG. 2 is an example of a cross-section of a test structure created on a semiconductor wafer by etching and deposition. The structure includes a series of parallel trenches. The pattern repeats on a regular pitch (200 nm in this example). The figure just shows a cross-section of a single unit cell of that repeating structure. Isolation trenches 202 are etched into silicon 201 and lilted with oxide. Typically, the oxide will be planarized after tilling. In this example, the trenches are approximately 50 nm deep. Then, after appropriate patterning, recesses 203 are etched into the silicon to a depth of about 75 nm. After cleaning and surface preparation, oxide film 204 is grown on the silicon surface (in a thermal oxidation step) to a thickness of approximately 4 nm. This test structure is constructed at the same time as the transistors and other circuit structures of the semiconductor device are fabricated from the same (or a superset of the same) process steps. Typically, the test structure is a simplified shape compared with actual devices. In this example, the test structure includes parallel trenches that are microns in length. It is to be understood that the shapes and dimensions of this example are illustrative and not limiting. Many different shapes and dimensions could be used in practice. Typically, the test structure will incorporate important dimensions from the devices being fabricated, so that measurements of the test structure provide information about the dimensions of the devices. It is also to be understood that the test structures need not be two-dimensional structures including parallel features with a constant cross-section. Three-dimensional shapes more closely representing the shapes of the devices being fabricated may also be used.

Figure 3:
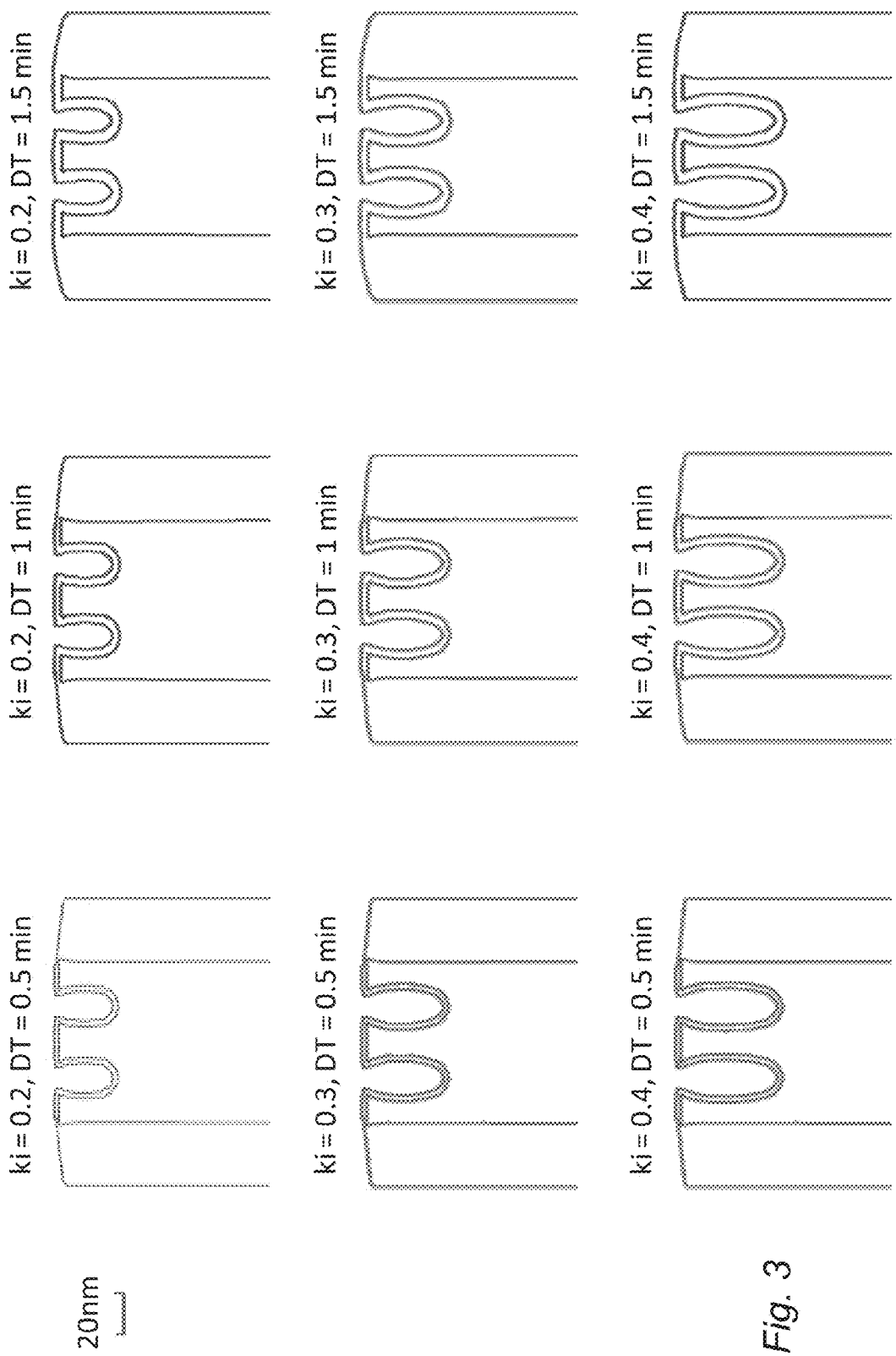
FIG. 3 is a schematic diagram illustrating cross-sectional views of different examples of variations in shape of the structure shown in FIG. 2 due to changes in process conditions.

FIG. 3 shows variations in shape of the structure shown in FIG. 2 due to changes in process conditions. In particular, FIG. 3 shows a series of cross-sections of the upper part of the structure shown in FIG. 2 for different process conditions. In order to keep the figure simple, this example just assumes that two process parameters, an etch rate, ki, and an oxide growth time, DT, are varying. In practice, there will be multiple process parameters that may vary for each of the process steps. The process simulation shows how the cross-sectional shape of the recess and the thickness of the oxide layer vary with process conditions. In this example, the simulation software predicts that the recess has a cross-section that is approximately a truncated ellipse in shape. Without the process simulation, an incorrect cross-section shape, such as a 'U' shape, might be assumed and a less accurate model would be built. With realistic assumptions about the cross-sectional shape, an appropriate parameterization of the shape can be chosen.

Figure 10:
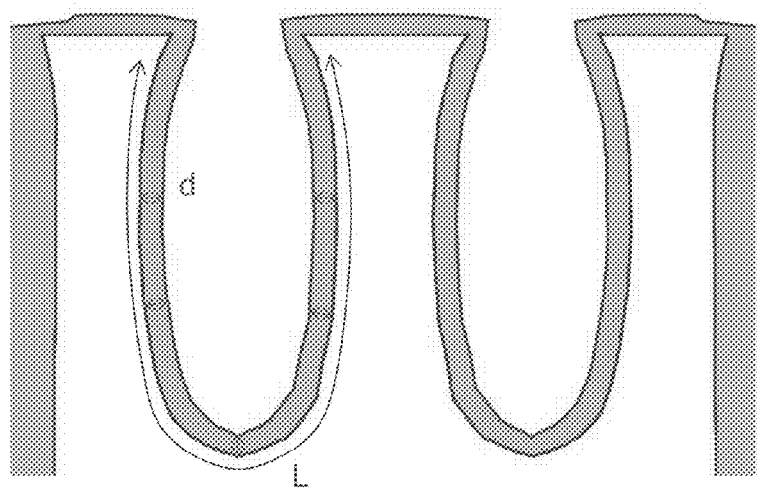
FIG. 10 is a schematic diagram illustrating a cross-sectional view of one example of oxide thickness variation.
Figure 11A:
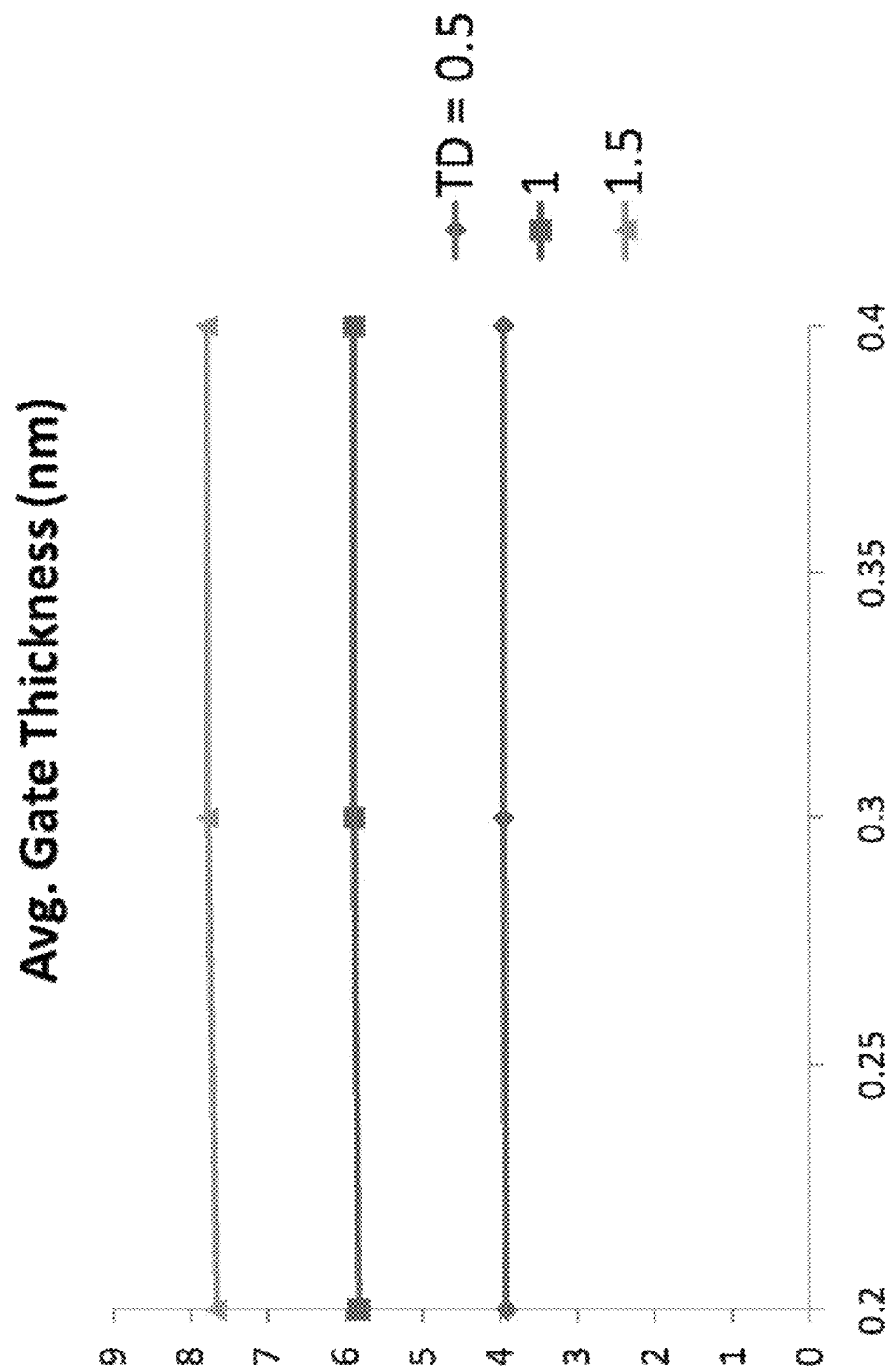
FIGS. 11a, 11b, and 11c are plots illustrating examples of how oxide and trench can vary with process conditions.
Figure 11B:
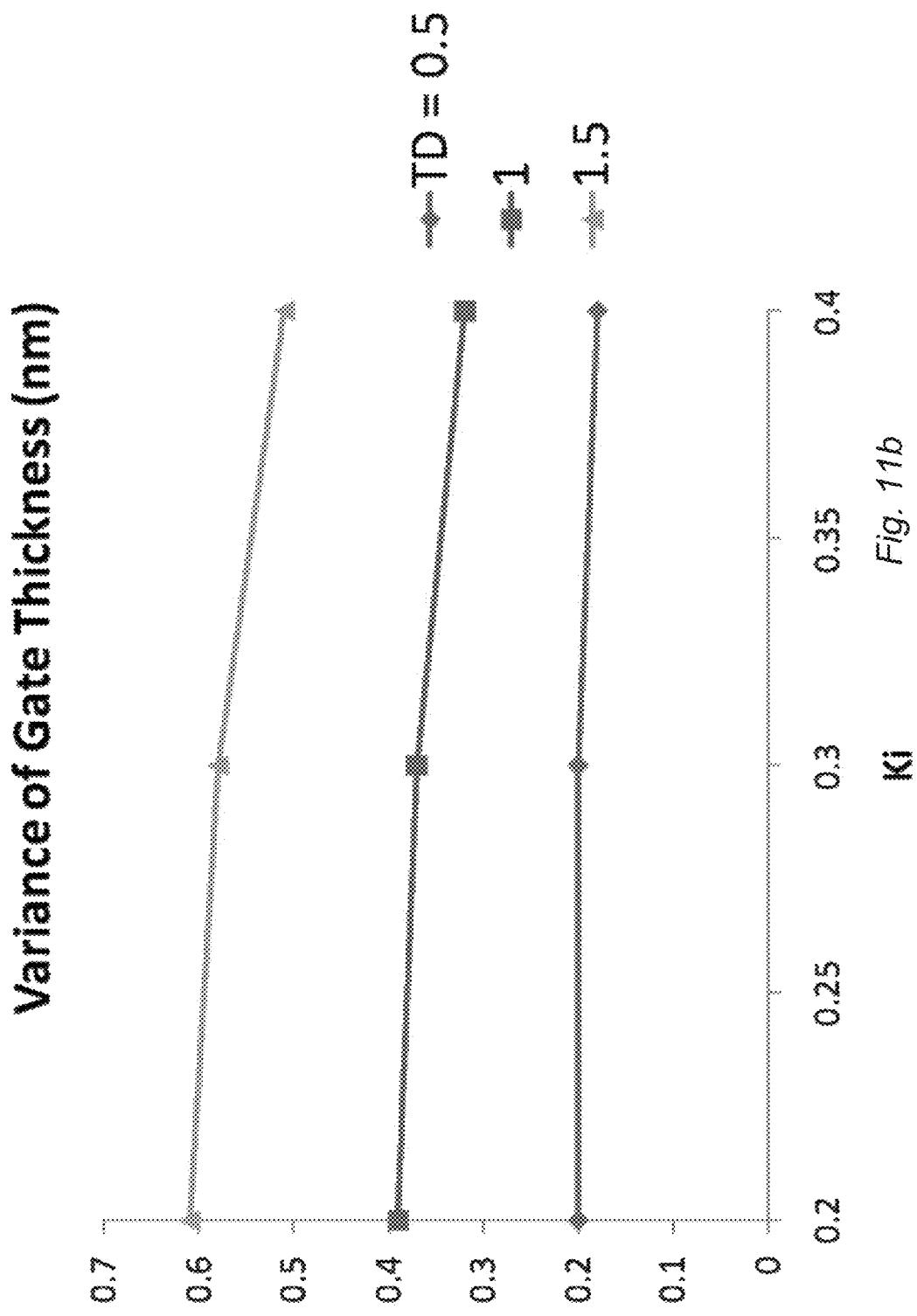
Figure 11C:
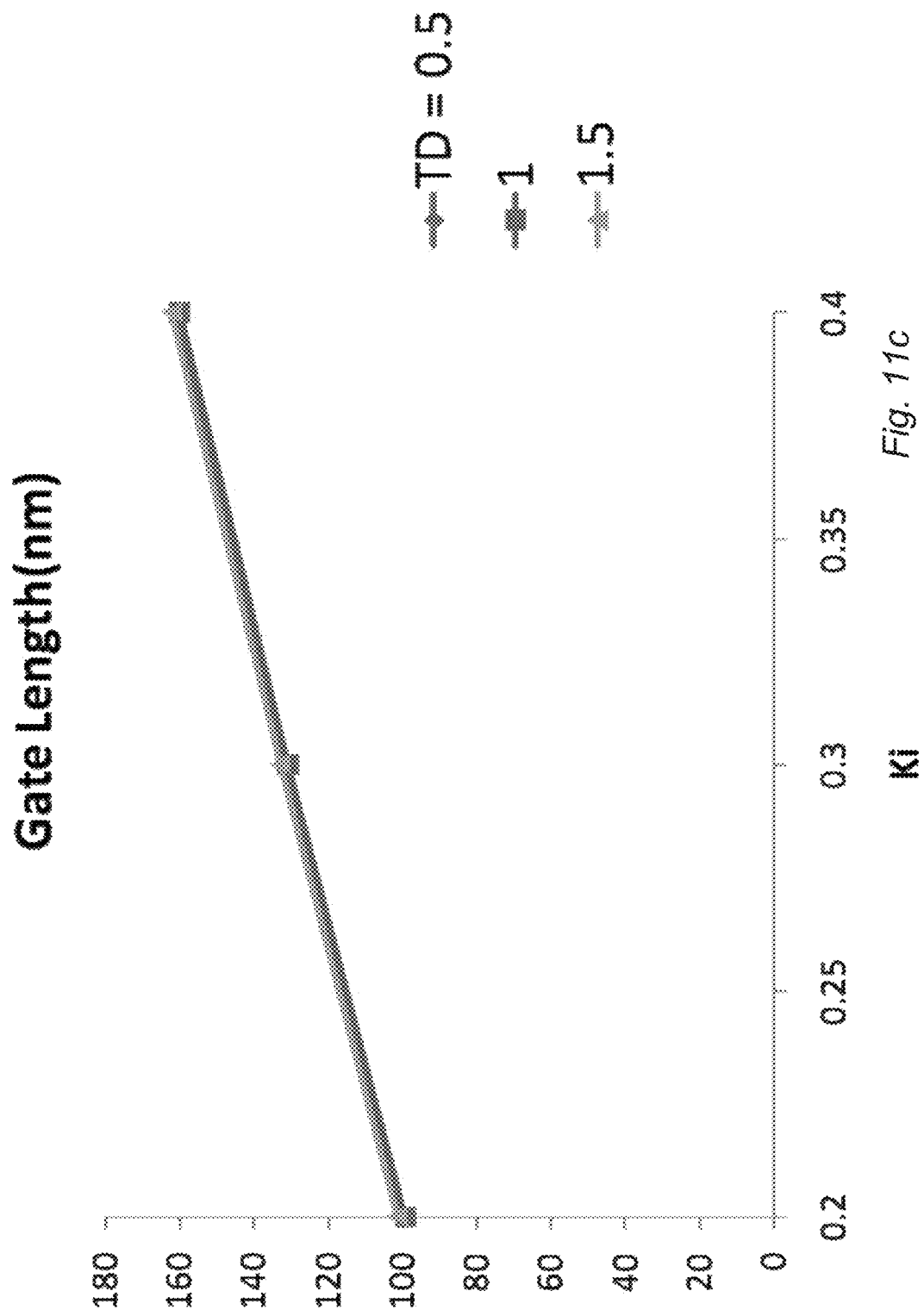

FIGS. 10 and 11a, 11b, and 11e show more detail on how the shapes shown in FIG. 3 vary with process conditions. FIG. 10 shows a definition of a channel length or gate length L along the curved surface of the trench. FIG. 10 also shows how a thickness d of the oxide layer is defined as a function of position along that curved surface as the minimum distance between the outside surface and the silicon surface. In other words, oxide thickness, d, can be defined by the minimal distances between the two interfaces of the gate oxide. A mean thickness, mean(d), and a thickness variance, variance(d), are defined in the equations shown in this figure. FIGS. 11a, 11b, and 11c show how these dimensional parameters vary with process conditions. In particular, FIG. 11a shows the average gate thickness (in nm) as a function of etch rate, ki, for different oxide growth times (TD). FIG. 11b shows the variance of gate thickness (in nm) as a function of etch rate, ki, for different oxide growth times (TD). FIG. 11c shows the gate length (in nm) as a function of etch rate, ki, for different oxide growth times (TD).

In some embodiments, the method includes determining a relationship between the one or more characteristics and the nominal and one or more different values, measuring the structure as formed on the wafer using an optical measurement technique, using results of the measuring to determine the one or more characteristics of the structure as formed on the wafer, and determining values of the process parameters used to form the structure on the wafer using the one or more determined characteristics in combination with the relationship. For example, simulations and analyses such as those shown in FIGS. 3, 10, and 11a, 11b, and 11c can be used to interpret the results of optical scatterometry measurements of the dimensions of the structure in terms of process conditions or changes in process conditions. Given measurements of, for example, average oxide (gate) thickness and gate length, relationships such as those plotted in FIGS. 11a, 11b, and 11c can be used to infer process conditions.

In one embodiment, both simulating steps include simulating the one or more characteristics as a function of position across the structure, and the initial model and the optical model are created to include mathematical functions that define variations in at least one of the one or more characteristics as a function of the position across the structure. For example, the oxide thickness variation will be different for different process conditions. In one example, a careful examination of the plots in FIG. 3 show that the oxide thickness, d, varies with position along the curved surface of the trench. Plots can be generated, each corresponding to one of the sets of process conditions shown in FIG. 3. Each plot could show the thickness of the oxide as a function of position along the surface of the trench from the left end of the left trench through to the right end of that trench. Each plot would show that the oxide thickness is not constant along the surface of the trench. This information can be used to correctly parameterize the model of the shape. Without the simulation results, the person creating the model would most likely just assume constant thickness for the oxide layer. However, in the embodiments described herein, a mathematical curve may be used to approximate the shape of the oxide layer and may be characterized by a small number of (ideally 2 or 3) varying parameters. If the curve has too many parameters, the measurement repeatability will be poor.

Figure 4A:
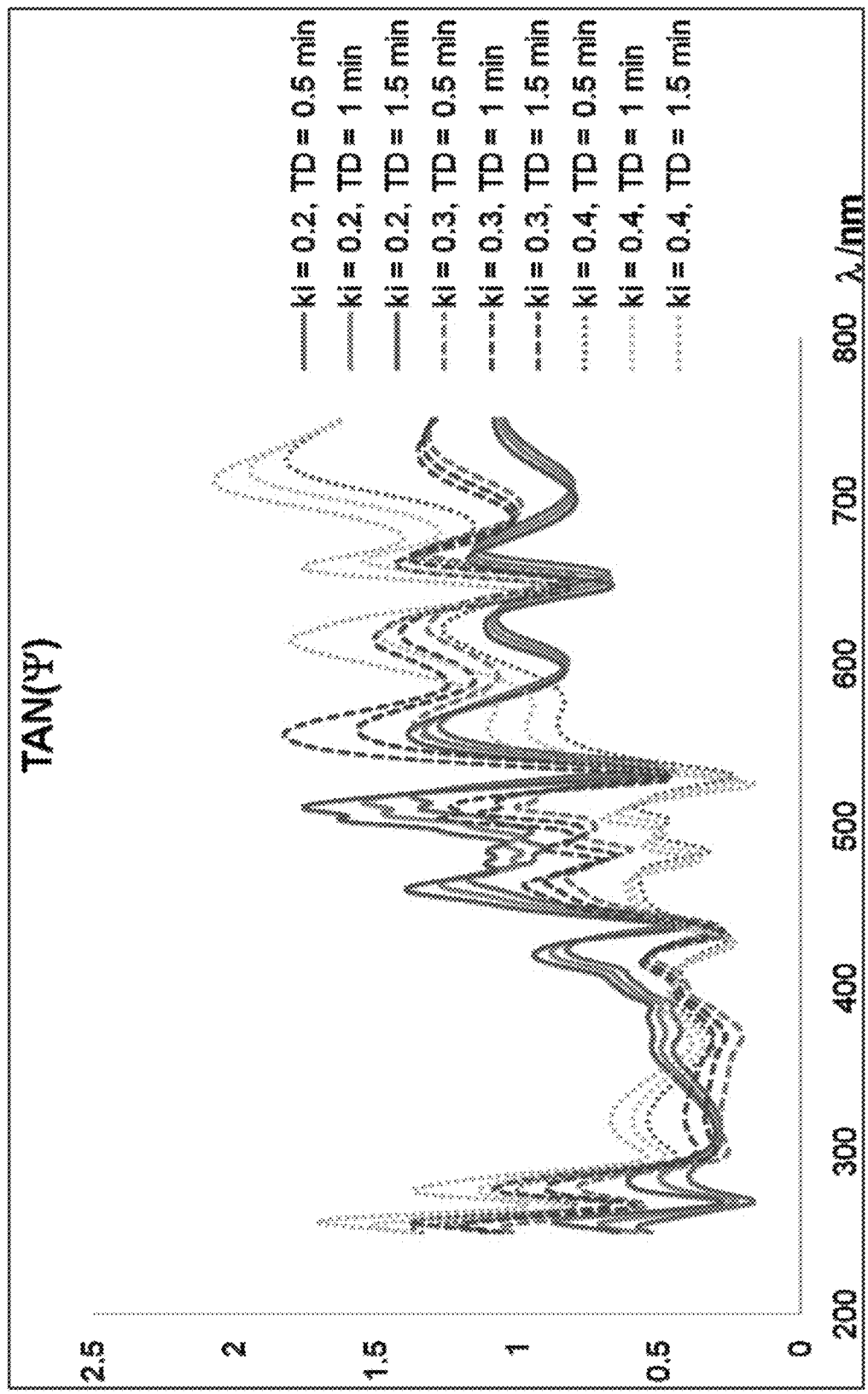
FIGS. 4a and 4b are plots that show the results of simulating the polarized optical reflectivity that would be measured by a spectroscopic ellipsometer from the structures of FIG. 3.
Figure 4B:
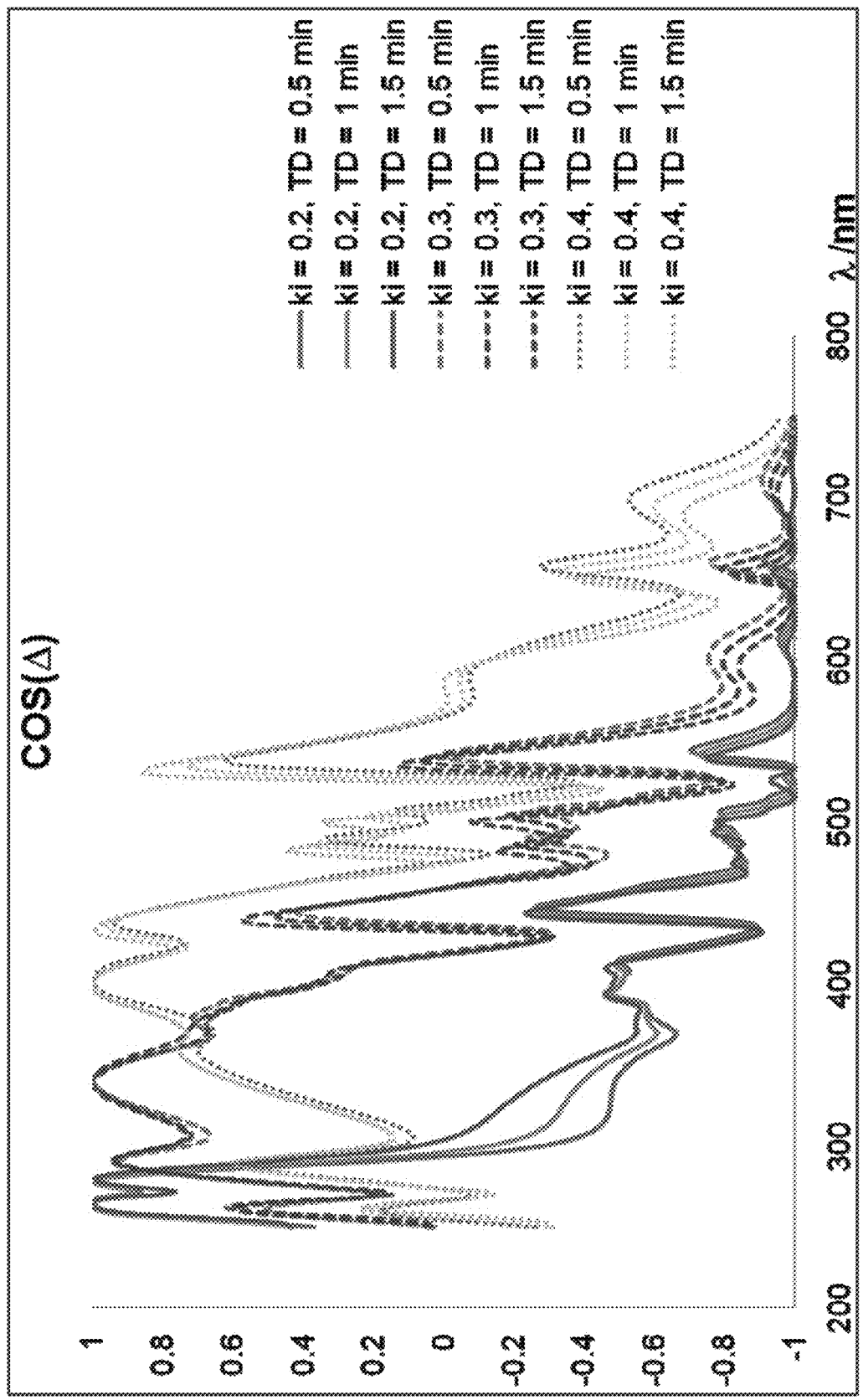

In another embodiment, the method includes simulating results of optical measurements of the structure that would be formed on the wafer using the nominal values and the one or more different values and determining which parameters of the optical measurements are more sensitive to changes in values of the process parameters than other parameters of the optical measurements. In one such embodiment, the method includes determining the parameters of the optical measurements that will be used to measure the structure as formed on the wafer based on the parameters of the optical measurements that are more sensitive to the changes in the values of the process parameters than the other parameters of the optical measurements. For example, FIGS. 4a and 4b show the results of simulating the polarized optical reflectivity that would be measured by a spectroscopic ellipsometer from the structures of FIG. 3 expressed as the ellipsometric parameters tan $\Psi$ and cos $\Delta$. In this manner, FIGS. 4a and 4b show the optical CD spectra from process variations. A finite element model of the periodic structure was used to compute the optical reflectivity. Such a model can be built using, for example, commercially available software such as COMSOL Multiphysics (COMSOL AB, Stockholm, Sweden) or JCM-suite (JCMwave GmbH, Berlin, Germany). These curves show which process changes can be detected most easily and which wavelengths are sensitive to which process changes. In this example, the curves separate into three families according to the three different etch rates, showing that, in this example, etch rate changes of the magnitude simulated can easily be detected. These curves also show which wavelength ranges have the most sensitivity to process parameter changes. For example, it can be seen in FIGS. 4a and 4b that the wavelength range from approximately 650 nm to 750 nm has good sensitivity to oxide growth time (TD) for the highest etch rate (ki=0.4), but lower sensitivity to the oxide growth time for the tower etch rates. Although this example shows the optical reflectivity being computed as a function of wavelength over a wide range of wavelengths for a narrow range of angles, it is to be understood that the reflectivity can be computed as a function of angles over wide ranges of angles of incidence and/or azimuthal angles for one, or few, wavelengths. It is also to be understood that the reflectivity can be computed for a variety of different polarization states including unpolarized incident radiation, linearly polarized incident radiation, and elliptically polarized incident radiation. The reflectivity of the structure may be calculated as ellipsometric parameters such as tan $\Psi$ and cos $\Delta$ as shown in FIGS. 4a and 4b, as elements, or combinations of elements, of the Jones matrix or Mueller matrix, or as other representations of the polarized or unpolarized reflectivity.

Other algorithms besides finite element methods may used to compute the optical reflectivity. These algorithms include the rigorous coupled wave algorithm (RCWA) as described, for example, in U.S. Pat. Nos. 5,963,329 to Conrad et al. and 6,608,690 to Niu et al. Other algorithms that can be used include those using Green's functions, such as those described in U.S. Pat. No. 7,038,850 to Chang et al., and finite difference methods such as those described in U.S. Pat. No. 7,106,459 to Chu. All of these patents are incorporated by reference as if fully set forth herein.

In one embodiment, the method includes generating a library of optical scatterometry signatures based on the one or more characteristics of the structure that would be formed on the wafer using the nominal values and the one or more different values. For example, the method may include constructing an optical CD library for measurement of the shape of a structure on a wafer. In addition, the method may include generating a library of optical scatterometry signatures to speed up an optical CD measurement. A series of process simulations are performed for an expected range of process parameter variations to generate a series of expected shapes. For example, the method may include simulating the shapes generated by a process operating on a wafer for multiple combinations of different process parameters. In one such example, for an etch process, the simulation may include simulating the expected shapes for a range of RF power levels, etch wafer bias voltages, etch times, wafer temperatures, gas flow rates, or some combination thereof. In one embodiment, the one or more different values include maximum and minimum values for one of the process parameters. For example, the simulation may include simulating the nominal values of all these process parameters and various combinations of maximum and minimum values of the process parameters. The set of different shapes from this simulation may then be used to calculate the optical signatures of scattering for the corresponding process conditions. A library may then be constructed using results of the simulations.

Figure 5:
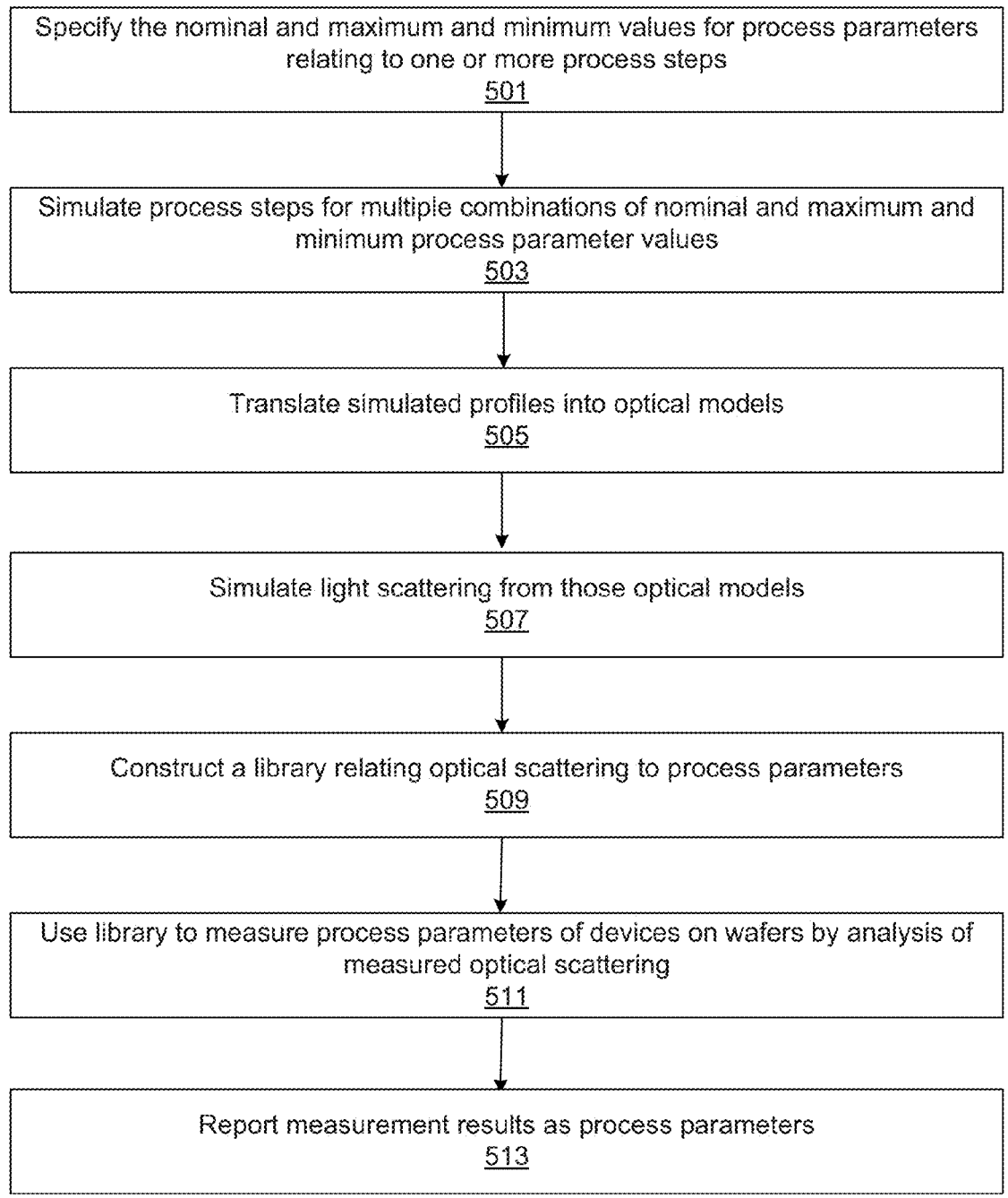
FIG. 5 is a flow chart illustrating one embodiment of a library development process.

As an illustration, simulated optical responses, such as those shown in FIGS. 4a and 4b, which correspond to a range of process conditions, may be used to create a library. Such a process is illustrated by the flow chart of FIG. 5. In particular, FIG. 5 is a flow chart for a library development process. As shown in step 501 of FIG. 5, the method may include specifying the nominal and maximum and minimum values for process parameters relating to one or more process steps. As described above, simulations of the structures to be measured are made for the process steps and different combinations of process conditions including, but not limited to, nominal process conditions and expected maximum and minimum values of different process parameters, as shown in FIG. 503. In some embodiments, all combinations of the process condition values may be simulated, as in the example shown in FIGS. 4a and 4b for two varying process conditions where all nine combinations of nominal, minimum and maximum values are simulated. In other embodiments, particularly where there are many varying process conditions, a subset of the possible combinations of process parameter values are simulated. The process conditions simulated need not be limited to nominal, minimum and maximum values. Other values lying between nominal and one of the extreme values might also be used in the simulation. For example, as shown in FIGS. 4a and 4b, there are relatively large changes in the optical signatures for changes in the etch rate parameter, ki. In such a case, it might be useful to include additional values of ki in the simulation, such as 0.25 and 0.35.

As shown in step 505, the method may also include translating simulated profiles into optical models. In addition, the method may include simulating light scattering from those optical models, as shown in step 507. The method may also include constructing a library relating optical scattering to process parameters, as shown in step 509. The method may further include using the library to measure process parameters of devices on wafers by analysis of measured optical scattering, as shown in step 511. In addition, the method may include reporting measurement results as process parameters, as shown in step 513. All of these steps may be performed as described further herein.

Examples of different methods of constructing and using libraries can be found in U.S. Pat. Nos. 5,607,800 to Ziger, 5,867,276 to McNeil et al., 5,963,329 to Conrad et al., 7,280,229 to Li et al., 7,312,881 to Shehegrov et al., 7,831,528 to Doddi et al., and 7,859,659 to Xu et al., all of which are incorporated by reference as if fully set forth herein. The library may include the simulated optical scattering signatures or a machine learning system, neural network, or statistical process trained on the simulated optical scattering. In one embodiment, generating the library includes storing the optical scatterometry signatures calculated for the nominal values and the one or more different values. In another embodiment, generating the library includes training software on the optical scatterometry signatures calculated for the nominal values and the one or more different values. For example, a library used for optical scatterometry may be based on storing optical signatures calculated for different process parameters or may be based on a machine learning system or neural network trained on those calculated optical signatures. Creation of the library may include performing statistical analysis on the optical signatures such as principal component analysis to reduce the amount of data that has to be stored without losing significant accuracy or sensitivity. The library may be used with interpolation when determining the process parameters that best fit the measured optical signal. Generating the library as described above is performed without measuring the structure as formed on any wafers. Compared with constructing a library from experimentally determined optical signatures measured from wafers processed under different conditions, the embodiments described herein have the advantage of resulting in a less noisy measurement because no experimental noise (whether due to process variations, due to noise in the optical signal, or due to noise and errors in reference measurements) is incorporated into the library.

In one embodiment, the method includes determining one or more characteristics of the structure as formed on a wafer using an optical measuring technique and determining one or more values of one or more of the process parameters used to form the structure on the wafer based on the one or more characteristics of the structure as formed on the wafer. In one such embodiment, the method also includes altering one or more parameters of a process tool based on the one or more determined values of the one or more of the process parameters. For example, the method may include using process simulation software such as ATHENA to help interpret the results of optical shape measurements. When one or more dimensions or shape parameters vary away from their nominal values, process simulation software can be used to determine which process parameters or conditions may have caused that change and can guide the appropriate corrective action or adjustment of the process chamber or process tool.

Figure 6:
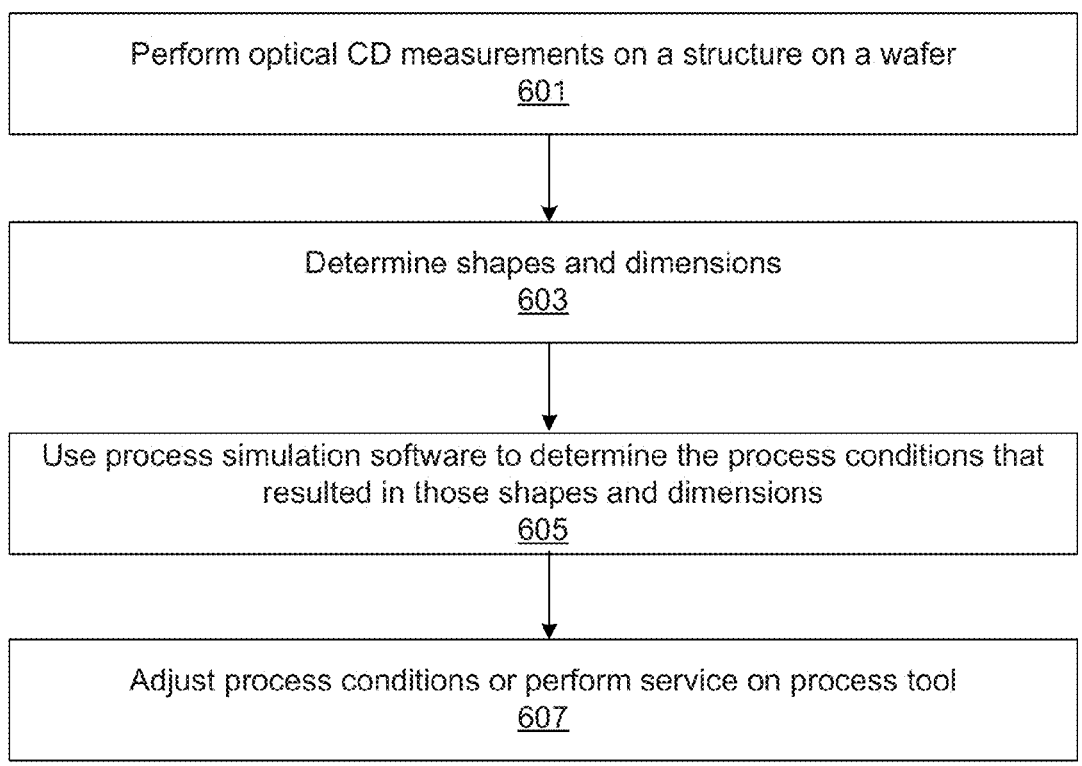
FIG. 6 is a flow chart illustrating one embodiment for interpreting optical critical dimension (CD) measurement results.

A flow chart showing one way to implement this is shown in FIG. 6. In particular, FIG. 6 is a flow chart for interpreting optical CD measurement results. As shown in step 601, the method includes performing optical CD measurements on a structure on a wafer. As shown in step 603, the method also includes determining shapes and dimensions. In addition, as shown in step 605, the method includes using process simulation software to determine the process conditions that resulted in those shapes and dimensions. The method further includes adjusting process conditions or performing service on the process tool, as shown in step 607.

In one embodiment, the method includes determining one or more characteristics of the structure as formed on a wafer using an optical measuring technique and determining one or more characteristics of a device that will be formed on the wafer and that will include the structure based on the one or more characteristics of the structure. In another embodiment, the method includes determining one or more characteristics of the structure as formed on a wafer using an optical measuring technique, determining one or more values of one or more of the process parameters used to form the structure on the wafer based on the one or more characteristics of the structure as formed on the wafer, and determining one or more characteristics of a device that will be formed on the wafer and that will include the structure based on the one or more determined values of the one or more of the process parameters. For example, the method may include using TCAD (transistor computer-aided design) software such as ATLAS or VICTORY Device sold by Silvaco, Inc. to interpret the results of optical measurements of dimensions and/or shapes and/or process conditions of device structures to determine whether or not the final devices are expected to perform within specification.

Figure 7:
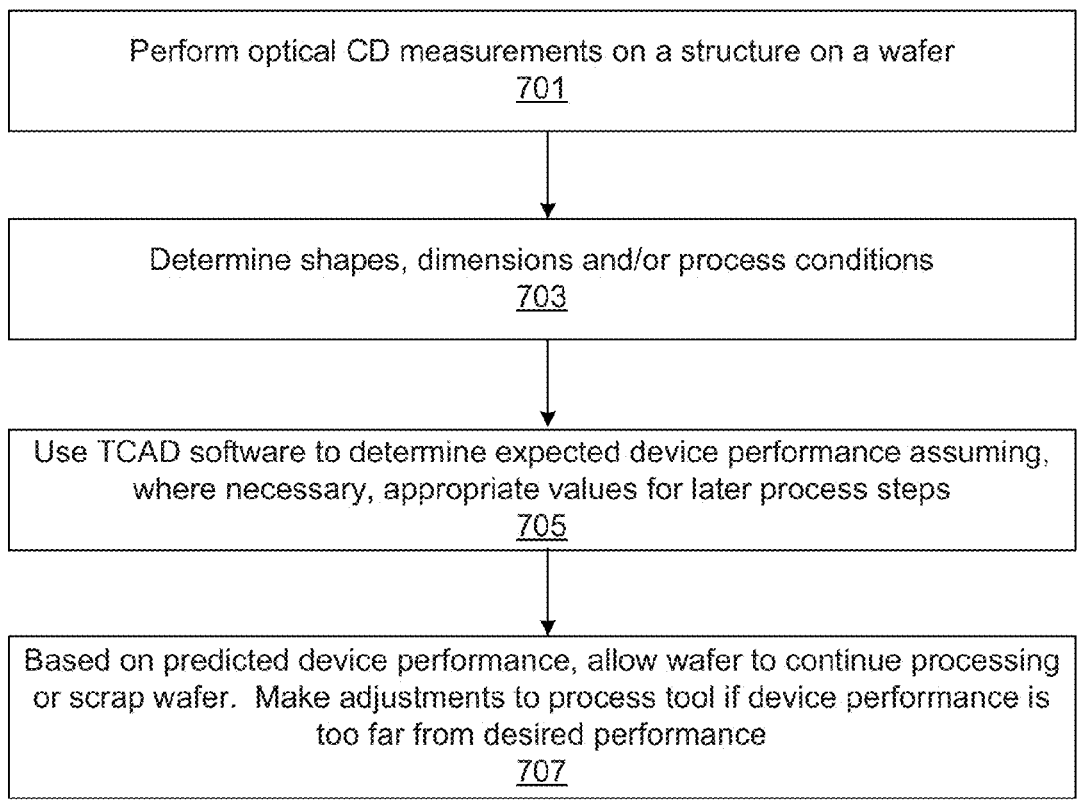
FIG. 7 is a flow chart illustrating one embodiment for interpreting optical CD measurement results using TCAD.

FIG. 7 is a flow chart for interpreting optical CD measurement results using TCAD. As shown in step 701, the method may include performing optical CD measurements on a structure on a wafer. In addition, as shown in step 703, the method includes determining shapes, dimensions, and/or process conditions of the structure. For example, the optical measurements can be used to quantify the actual dimensions and shapes at different locations on a wafer or the process conditions that generated those shapes. The actual device performance can be modeled based on those shapes, dimensions, process conditions, or some combination thereof. For example, as shown in step 705, the method may include using WAD software to determine expected device performance assuming, where necessary, appropriate values for later process steps. As shown in step 707, the method may also include, based on predicted device performance, allowing the wafer to continue processing or scrapping the wafer. For example, if the expected device performance is within specification, the wafers can continue to subsequent processing steps. If the expected device performance is not within specification, then the wafers can be scrapped to avoid the expense of the subsequent process steps and changes can be made to the appropriate process tool so that subsequent wafers will be within specification. In addition, as shown in step 707, the method may include making adjustments to a process tool if the device performance is too far from the desired performance. For example, in some cases where the expected device performance is within specification but is close to a limit of that specification, process conditions may be adjusted to make subsequent wafers yield devices closer to the desired specification. The desired specification may include properties related to the device speed, the device power consumption, the memory retention time, the memory reliability or other important transistor characteristics such as threshold voltage, leakage current, and saturated continuous drain current (Idsat).

Continuous drain current vs. gate source voltage (Id-Vgs) curves can be plotted for transistors constructed using the different process conditions shown in FIG. 3. In order to compute the transistor properties, it is necessary to assume nominal (or actual measured) conditions for all the other process steps including implants and source and drain contacts.

one embodiment, the method includes determining two or more characteristics of the structure as formed on a wafer using an optical measuring technique, determining one or more characteristics of a device that wilt be formed on the wafer and that will include the structure based on a combination of the two or more characteristics of the structure as formed on the wafer, and determining if the one or more characteristics of the device will be out of specification for the one or more characteristics of the device. For example, in traditional process control, limits are set individually on measured parameters such as width, height, depth, slope and undercut. Typically, the limits have to be set so that any combination of parameters within the limits will result in devices that are in specification. But the performance of the devices is determined by combinations of multiple parameters. If the performance of the devices is just out of specification when all parameters are at their limit values, then there will be combinations of parameters where some are just outside their limits and others are within limits that will not result in out-of-specification devices. By using TCAD modeling to predict the device performance, higher yields may be obtained because certain combinations of parameters that are expected to yield within-specification devices do not need to be rejected based on a single parameter being outside of a fixed limit. Some parameters may continue to be monitored based on upper and lower limits as there can be factors other than just device performance that are also important such as compatibility with subsequent process steps.

Figure 8:
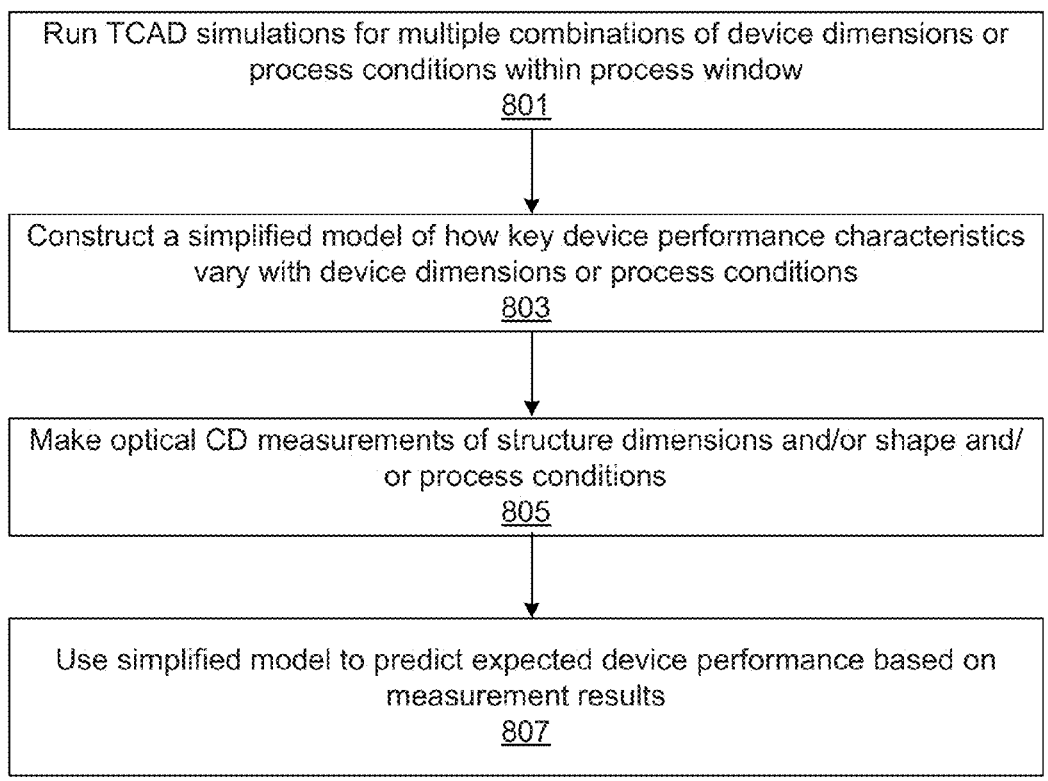
FIG. 8 is a flow chart illustrating one embodiment for developing a simplified process model for interpreting results.

In one embodiment, the method includes simulating, using results of both of the simulating steps and a first model, one or more characteristics of a device that will be formed on the wafer using the nominal and one or more different values of the process parameters and that will include the structure and generating a second model that is simpler than the first model and that describes the one or more characteristics of the device as a function of the results of both of the simulating steps. For example, FIG. 8 shows one embodiment of a method for developing a simplified process model for interpreting results. As shown in FIG. 8, the method may include running TCAD simulations for multiple combinations of device dimensions or process conditions within process windows, as shown in step 801. For example, since the TCAD computation of the expected device performance given shape and dimensional information may be slow, in some embodiments, multiple TCAD simulations for different shapes and dimensions are run. As shown in step 803, the method includes constructing a simplified model of how key device performance characteristics vary with device dimensions or process conditions. For example, the results may be used to train a neural network or machine learning system or other kind of simplified model of expected device performance as a function of shape and dimensions for a limited range of shapes and dimensions. The method also includes making optical CD measurements of structure dimensions and/or shape and/or process conditions, as shown in step 805. That simplified model can then be used to quickly analyze the results of measurements on specific wafers to determine when the devices are likely to be in or out of specification. For example, as shown in step 807, the method may include using the simplified model to predict expected device performance based on measurement results. Even if that simplified model is not as accurate as the full TCAD simulation, it may be accurate enough that the chances of misclassifying a wafer are acceptably small. Besides neural networks and machine learning systems, other simplified models might be polynomials such as linear, quadratic or cubic functions of the parameters, or might use other mathematical functions of the parameters.

In another embodiment, the method includes generating a test structure design based on results of both of the simulating steps such that one or more characteristics of a test structure as formed on the wafer in accordance with the test structure design are sensitive to changes in values of one or more, but not all, of the process parameters. For example, the methods described herein may include using process simulation software such as ATHENA to design test structures that are particularly sensitive to changes in specific process parameters or process conditions of interest so as to make those changes easier to detect.

In some embodiments, the method includes generating first and second test structure designs based on results of both of the simulating steps such that one or more characteristics of a first test structure as formed on the wafer in accordance with the first test structure design are sensitive to a first of the process parameters but not a second of the process parameters and such that one or more characteristics of a second test structure as formed on the wafer in accordance with the second test structure design are sensitive to the second of the process parameters but not the first of the process parameters. For example, two or more different test structures may be designed no that each is particularly sensitive to changes in a different subset of the process parameters or conditions such that, in combination, the two or more structures are sensitive to changes in all the process parameters of interest. After a wafer has been processed, the two or more test structures may be measured by optical CD metrology in order to determine if the process parameters are in control. Two or more different structures may be particularly useful when many different process parameters may be changing and from a single structure it may be difficult to separate the effects of one process parameter changing from another.

Figure 9:
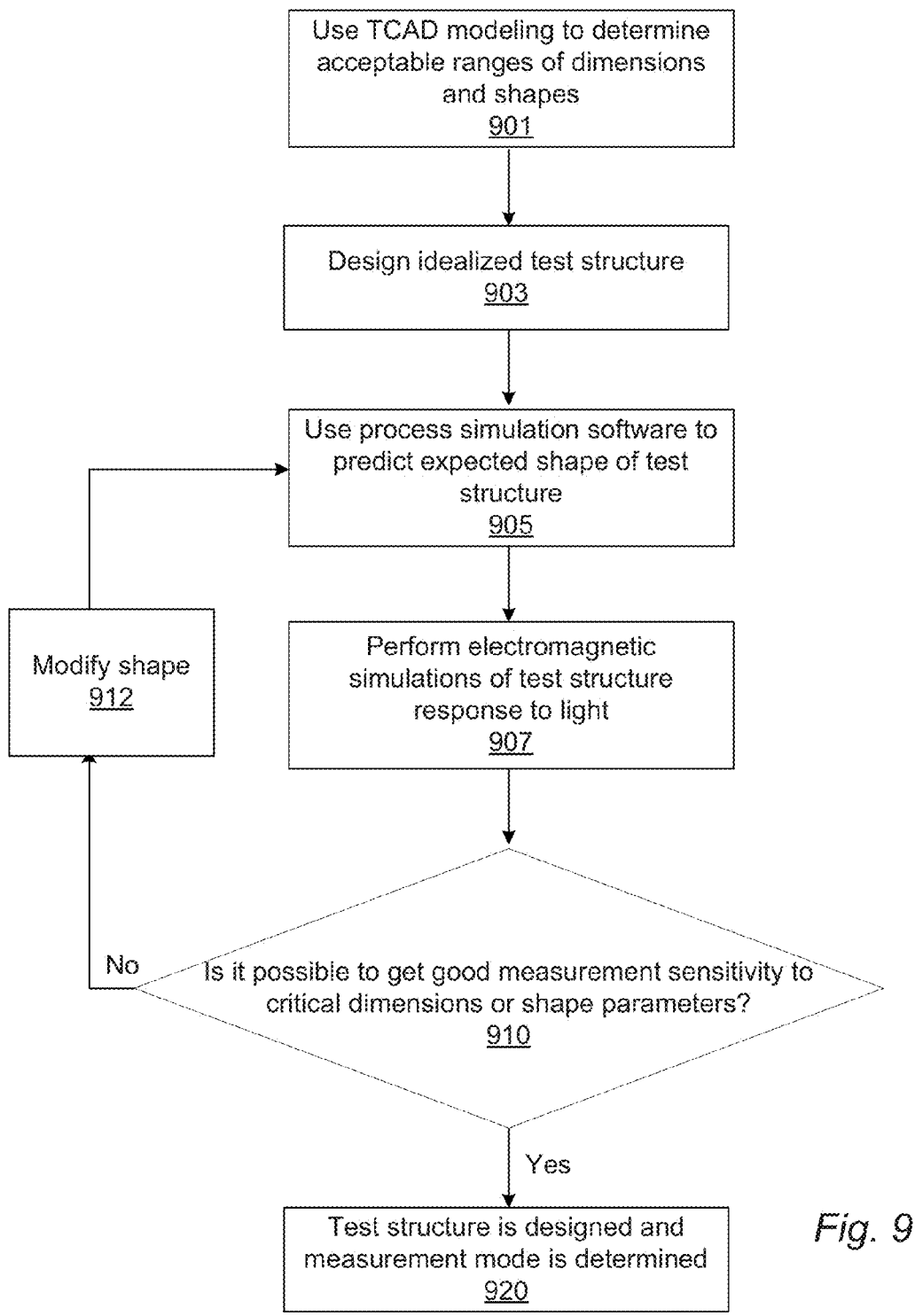
FIG. 9 is a flow chart illustrating one embodiment for designing a test structure.

In one embodiment, the method includes generating a test structure design based on results of both of the simulating steps such that optical measurements of one or more characteristics of a test structure formed on the wafer in accordance with the test structure design are sensitive to changes in the one or more characteristics of the test structure. For example, in order to design test structures as described herein, the method may include using process simulation software in combination with predictions of the optical scattering from test structures. FIG. 9 illustrates a process for designing a test structure.

As shown in step 901, the method may include using TCAD modeling of the performance of devices for a range of different dimensions such as heights, depths, widths, lengths, side-wall angles, etc. to determine how much variability of the shape is allowed (e.g., the acceptable range of dimensions and shapes) given the required range of device performance that is acceptable. This analysis will also identify which dimensions or shape parameters are most critical to device performance and so might need to be monitored closely.

As shown in step 903, the method includes designing an idealized test structure that is consistent with the process design rules and which incorporates some or all of the critical dimensions or shape parameters identified in step 901. Other aspects of the shape of the test structure may be simplified compared with the actual devices.

As shown in step 905, the method includes using process simulation software such as ATHENA or VICTORY to predict the expected shape of the test structure as a result of the etch, deposition, and other processes used.

As shown in step 907, the method includes performing electromagnetic simulations of the test structure response to light (e.g., to determine the electric fields in the structure under different illumination conditions). The electromagnetic simulation may be performed as described in copending U.S. patent application Ser. No. 13/164,398 by Dziura et al., filed on Jun. 20, 2011, which is incorporated herein by reference in its entirety. If the electric fields are strong near the critical features and dimensions under at least some of the measurement conditions, then the proposed test structure may have good sensitivity to changes in those features or dimensions. If the electric field is weak near a critical feature or dimension, then the sensitivity to that feature or dimension is likely to be poor, and the test structure design should be modified. This check is performed at step 910 in which it is determined if it is possible to get good measurement sensitivity to critical dimensions or shape parameters. If the electric field is weak, then one or more dimensions of the proposed structure are modified at step 912 and the simulations in step 905 are repeated. Dimensions that might be changed include non-critical dimensions such as the pitch of the repeating structure. Any new dimensions must be consistent with the design rules.

Step 907 may also include simulating far fields as well as, or instead of, near fields. If a change in a dimension or shape parameter produces too small a change in far fields (relative to system noise levels), then the measurement sensitivity to that change will be poor. If the change in the far field is larger than noise and errors in the measurement, then the sensitivity to that change will be good. As shown in step 920, the method may also include designing the test structure and determining the measurement mode to be used for the test structure. For example, step 920 may include simulating multiple different illumination and/or detection conditions to determine which of several possible measurement modes has the best sensitivity. In some cases, a combination of measurement modes may be used, because the combination may have sensitivity to more dimensions and parameters of interest than any individual mode.

Test structures designed in accordance with embodiments described herein may be placed in the scribe lines between the die on a semiconductor wafer or may be placed in the die in regions between active circuit structures in the die.

Although ATHENA and VICTORY Process are mentioned as examples of the process simulation software that may be used in embodiments described herein, it is to be understood that any other process simulation software could be substituted. For lithography process steps, a lithography simulator such as PROLITH sold by KLA-Tencor Corp., Milpitas, Calif., or SIGMA-C sold by Synopsys, Inc., Mountain View, Calif., may be used.

All of the methods described herein may include storing results of one or more steps of the methods in a storage medium. The results may include any of the results described herein and may be stored in any manner known in the art. The storage medium may include any suitable computer-readable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time.

Figure 12:
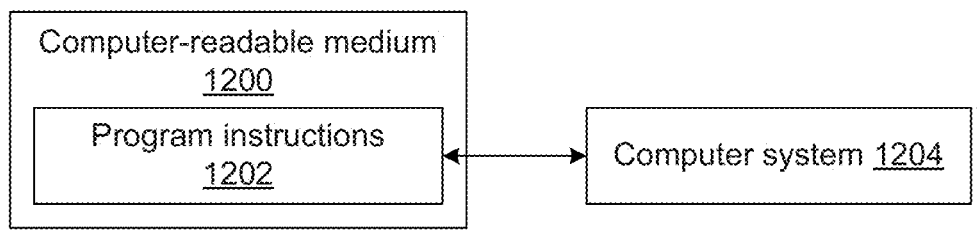
FIG. 12 is a block diagram illustrating one embodiment of a non-transitory computer-readable medium.

FIG. 12 illustrates one embodiment of non-transitory computer-readable medium 1200 storing program instructions 1202 executable on computer system 1204 for performing a computer-implemented method for generating an optical model of a structure to be measured on a semiconductor wafer. The method for which program instructions 1202 are executable on computer system 1204 may include any step(s) of any method(s) described herein. In some embodiments, computer system 1204 may be a computer system of an optical measurement system as described further herein. In some alternative embodiments, the computer system may be connected to the optical measurement system by a network. However, in other embodiments, computer system 1204 may not be coupled to or included in an optical measurement system. In some such embodiments, computer system 1204 may be configured as a stand alone computer system. Computer-readable medium 1200, program instructions 1202, and computer system 1204 may be further configured as described herein.

Program instructions 1202 implementing methods such as those described herein may be stored on computer-readable medium 1200. The computer-readable medium may be a storage medium such as a read-only memory, a random access memory, a magnetic or optical disk, a magnetic tape, or other non-transitory computer-readable medium.

The program instructions may be implemented in any of various ways, including procedure-based techniques, component-based techniques, and/or object-oriented techniques, among others. For example, the program instructions may be implemented using ActiveX controls, C++ objects, C#, JavaBeans, Microsoft Foundation Classes ("MFC"), or other technologies or methodologies, as desired.

The computer system may include any suitable computer system known in the art. For example, computer system 1204 may take various forms, including a personal computer system, mainframe computer system, workstation, image computer, parallel processor, or any other device known in the art. In general, the term "computer system" may be broadly defined to encompass any device having one or more processors, which executes instructions from a memory medium.

Figure 13:
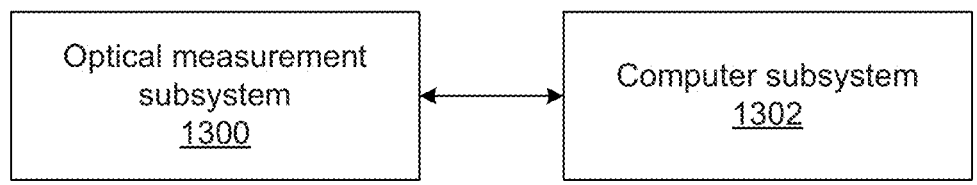
FIG. 13 is a block diagram illustrating one embodiment of a system.

Another embodiment relates to a system configured to generate an optical model of a structure to be measured on a semiconductor wafer. For example, as shown in FIG. 13, the system includes optical measurement subsystem 1300 configured to measure the structure as formed on the wafer. For example, any of the above methods may be used with an optical metrology system to perform the measurements. That optical metrology system might include an ellipsometer, a polarized reflectometer, on unpolarized reflectometer, a beam-profile reflectometer, or some combination thereof. FIG. 1 of U.S. Pat. No. 5,608,526 to Piwonka-Corle et al., which is incorporated by reference as if fully set forth herein, shows one example of a spectroscopic ellipsometer that may used with the methods and test structures described herein. FIG. 16 of U.S. patent application Ser. No. 13/164,398, which is incorporated by reference as if fully set forth herein, shows a beam profile reflectometer suitable for implementing embodiments described herein.

Examples of systems that could be used to measure the diffraction beam data or signals for use with the embodiments described herein are described in U.S. Pat. Nos. 6,278,519 to Rosencwaig et al., 6,611,330 to Lee et al, and 6,734,967 to Piwonka-Corle et al., all of which are incorporated herein by reference in their entirety. These three patents describe metrology systems that may be configured with multiple measurement subsystems, including one or more of a spectroscopic ellipsometer, a single-wavelength ellipsometer, a broadband reflectometer, a MTV reflectometer, a broadband polarized reflectometer, a beam-profile reflectometer, and a beam-profile ellipsometer. These measurement subsystems may be used individually, or in combination, to measure the reflected or diffracted beam from films and patterned structures. The signals collected these measurements may be analyzed to determine parameters of structures on a semiconductor wafer and/or infer process conditions in accordance with embodiments described herein. Embodiments described herein may be used to predict the response and sensitivity of one or more different subsystems such as those just listed to changes in process conditions for a specific structure in order to determine which subsystem is best for a particular measurement.

More information on how beam-profile reflectometers and ellipsometers can be used for scatterometry measurements can be found in U.S. Pat. Nos. 6,479,943 to Opsal et al., 6,678,046 to Opsal, 6,813,034 to Rosencwaig et al., and 7,206,070 to Opsal, all of which are incorporated by reference as if fully set forth herein.

Figure 14:
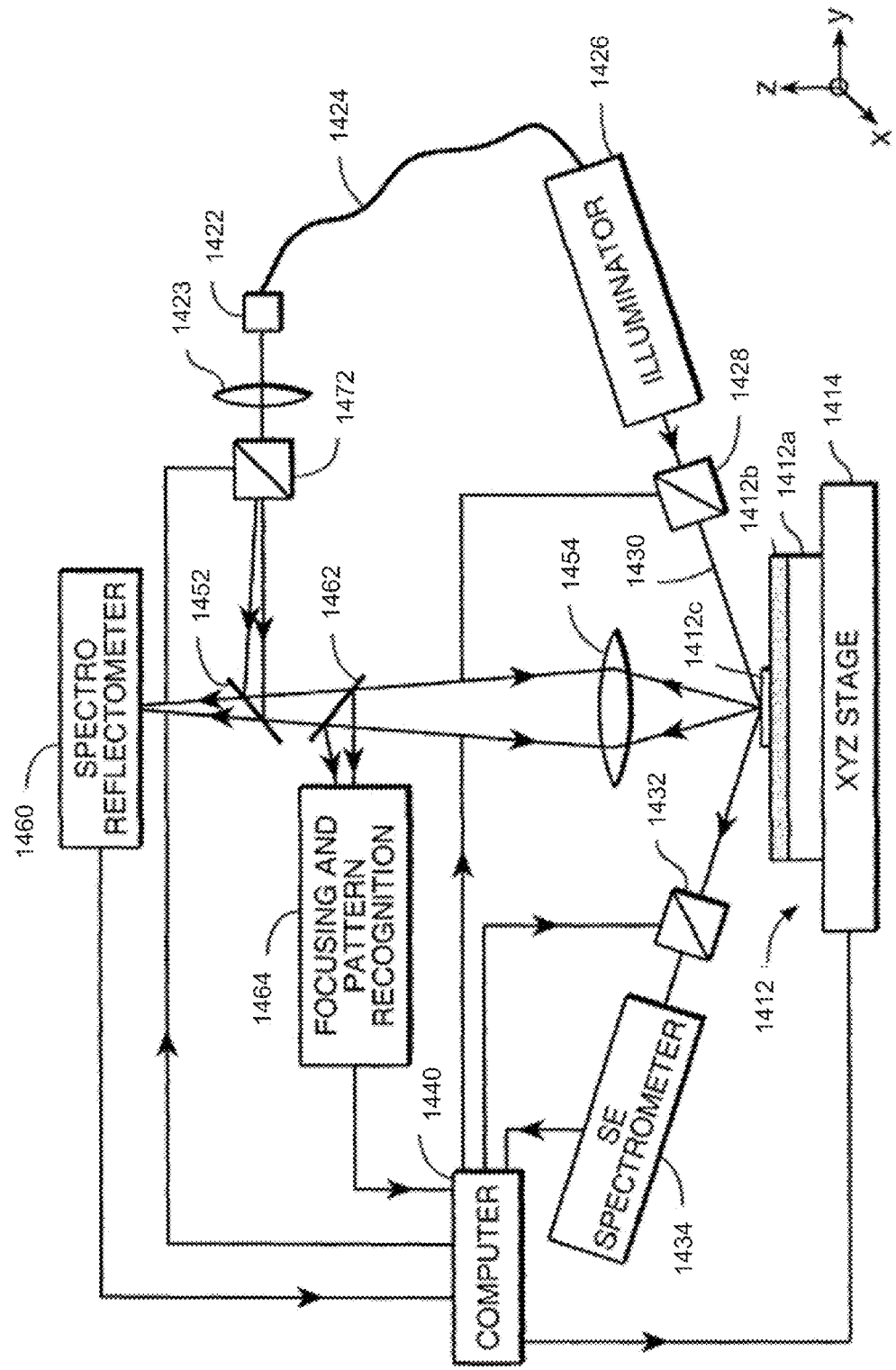
FIGS. 14 and 15 are schematic diagrams illustrating side views of various embodiments of an optical measurement subsystem that may be included in the systems described herein.

In general, the optical measurement subsystem may be configured as a spectroscopic optical measuring instrument for measuring the shape of a structure. An exemplary embodiment is shown in FIG. 14. Semiconductor wafer 1412 may include silicon substrate 1412a, film 1412b on the substrate, and structure 1412c on the film. XYZ stage 1414 is used for moving the wafer in the horizontal XY directions. Stage 1414 may also be used to adjust the z height of wafer 1412. The instrument may include broadband light source 1422 that is configured to generate light having a plurality of wavelengths. That light may be directed by fiber optic 1424 to an ellipsometer illuminator 1426, then through polarizer 1428, to optics (not shown) that focus tight 1430 on structure 1412c, to optics (not shown) that collect the light reflected from the structure, through analyzer 1432, to spectrometer 1434 that detects the reflected light as a function of wavelength white the polarizer 1428 or analyzer 1432 is rotated. This exemplary embodiment may also include a spectroscopic reflectometer that uses lens 1423 to focus and direct light from light source 1422 through optional polarizer 1472 to beam splitter 1452. Objective lens 1454 focuses light onto the structure 1412c and collects light reflected from the structure and directs that light back to spectro-reflectometer 1460 that detects the light as a function of wavelength. This subsystem may further include a focusing and pattern recognition subsystem 1464, that receives light via beam splitter 1462. The optical measurement subsystem may also include computer 1440, which may be configured as described herein. This exemplary embodiment is not intended to be limiting, but rather to illustrate some of the possible elements and features of a spectroscopic optical measurement subsystem suitable for use in certain embodiments described herein. Each of these elements may be arranged in any suitable configuration in the optical measuring instrument and may include any suitable elements known in the art. The system shown in FIG. 14 may be further configured as described in U.S. Pat. No. 6,483,580 to Xu et al., which is incorporated by reference as if fully set forth herein.

Figure 15:
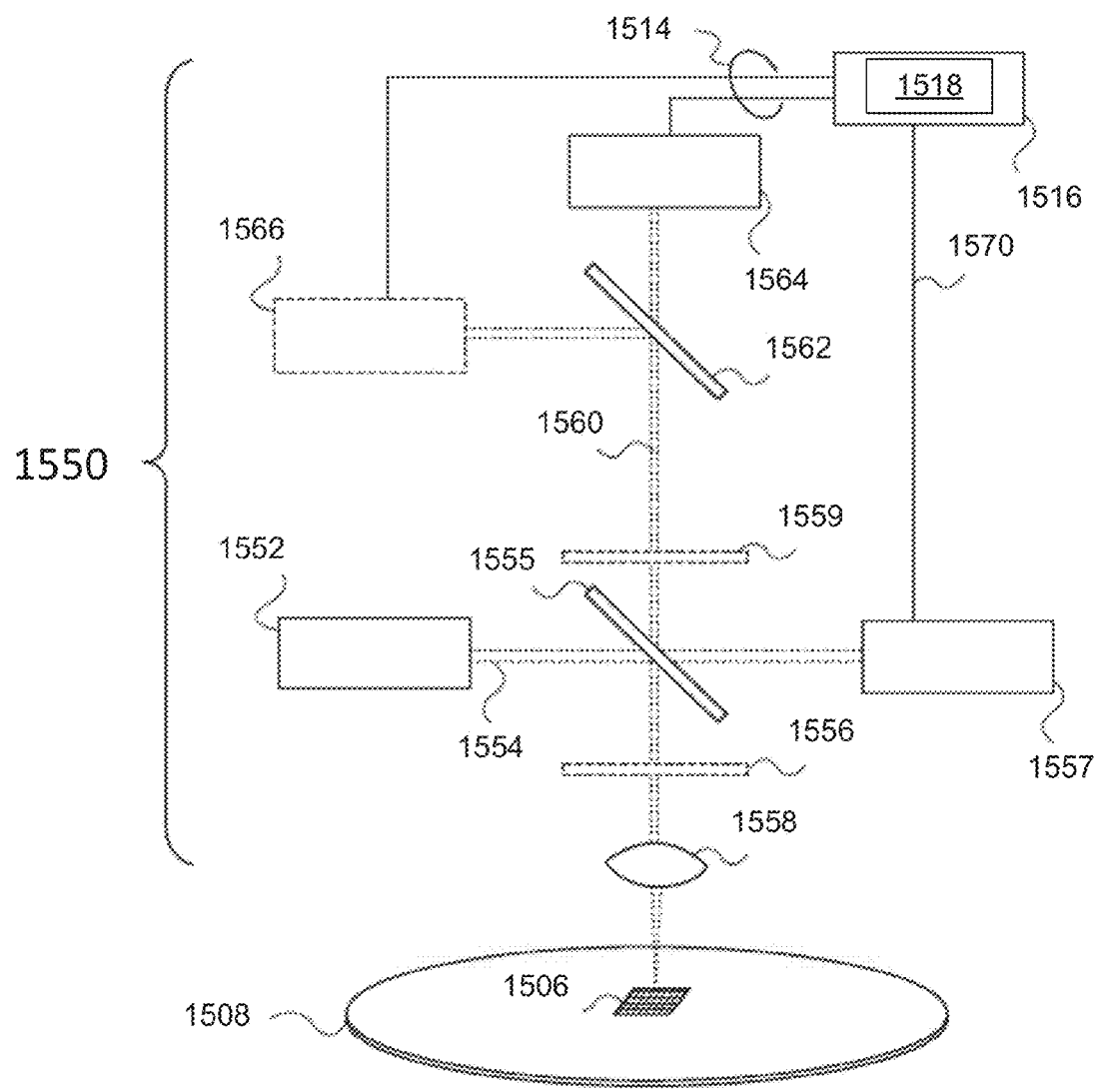

In another example, the optical measurement subsystem may be configured as an angle-resolved optical measuring instrument configured for measuring the shape of a structure as illustrated by 1550 in FIG. 15. The instrument may include light source 1552 generating polarized light beam 1554. Preferably this light has a bandwidth of approximately 10 nm or less. In some embodiments; the source 1552 is capable of outputting beams of different wavelengths. Part of this beam is reflected from beam splitter 1555 and directed to objective lens 1558 that focuses the light onto structure 1506 on wafer 1508 in a spot size of less than about 10 µm in each direction. The part of beam 1554 that is not reflected from the beam splitter is directed to beam intensity monitor 1557. The beam may, optionally, pass through quarter-wave plate 1556 before the objective lens 1558. The light reflected from structure 1506 is collected by objective lens 1558. After the beamsplitter, the reflected beam 1560 may optionally pass through a quarter-wave plate at location 1559 as an alternative to location 1556. A polarizer or polarizing beam splitter 1562 directs one polarization state of the reflected beam 1560 to detector 1564, and, optionally, directs a different polarization state to an optional second detector 1566. Detectors 1564 and 1566 detect the reflected light as a function of angle of incidence and azimuth angle. The diffraction beam data 1514 from the detector(s) is transmitted to profile application server 1516 along with beam intensity data 1570. The profile application server 1516 may compare the measured diffraction beam data 1514 after normalization or correction by beam intensity data 1570 against a library 1518 of simulated diffraction beam data representing varying combinations of critical dimensions of the target structure and resolution. Each of these elements may be arranged in any suitable configuration in the optical measuring instrument and may include any suitable elements known in the art. The optical measuring instrument shown in FIG. 15 may be further configured as described in U.S. patent application Ser. No. 13/164,298 to Dziura et al., filed Jun. 20, 2011, which is incorporated by reference as if fully set forth herein.

The system also includes computer subsystem 1302 configured for performing the steps of the methods described above. Computer subsystem 1302 may be further configured as described above with respect to computer system 1204. For example, the computer subsystem may be configured to process output responsive to the reflected light detected by the spectroscopic or angle-resolved optical measuring instrument described above and to report a process parameter, a parameter, or an expected device performance parameter of the structure. The computer subsystem and the system may be further configured as described herein.

U.S. Pat. No. 8,090,558 to Dziura and U.S. patent application Ser. Nos. 12/841,932 to Ferns et al., filed on Jul. 22, 2010, and 61/555,108 to Yoo et al. filed on Nov. 3, 2011, are incorporated by reference as if fully set forth herein. The embodiments described herein may be further configured as described in this patent and these patent applications.

The embodiments described herein provide several advantages over other currently used systems and methods. For example, the time required to develop scatterometry models is reduced compared with the current approach. The resulting model will more accurately represent the shape of the structures on the wafer. Measurement results can be quickly interpreted in terms of process conditions. Measurement results can quickly be interpreted in terms of the expected device performance. More accurate disposition of wafers can be made based on the expected device performance instead of occasionally discarding wafers that would actually have a useful yield or passing wafers for subsequent process steps even though the device performance is poor. Test structures can be designed which make the metrology more sensitive to changes in a process thereby allowing more precise control of the process.

Further modifications and alternative embodiments of various aspects of the invention may be apparent to those skilled in the art in view of this description. For example, systems and methods for process aware metrology are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art alter having the benefit of this description of the invention. Changes may be made in the elements described herein without departing from the spirit and scope of the invention as described in the following claims.

What is claimed is:

1. A computer-implemented method for generating an optical model of a structure to be measured on a semiconductor wafer, comprising:
    selecting nominal values and one or more different values of process parameters for one or more process steps used to form the structure on the wafer;
    simulating one or more characteristics of the structure that would be formed on the wafer using the nominal values;
    generating an initial model of the structure based on results of said simulating;
    simulating the one or more characteristics of the structure that would be formed on the wafer using the one or more different values as input to the initial model;
    translating results of both of the simulating steps into the optical model of the structure; and
    determining parameterization of the optical model based on how the one or more characteristics of the structure vary between at least two of the nominal values and the one or more different values, wherein the selecting step, both simulating steps, the generating step, the translating step, and the determining step are performed without using images of the structure as formed on a wafer and before the structure is formed on any wafers, and wherein the selecting step, both simulating steps, the generating step, the translating step, and the determining step are performed using a computer system.

2. The method of claim 1, wherein determining the parameterization comprises selecting parameters that are included in the optical model.

3. The method of claim 1, wherein determining the parameterization comprises determining parameters of the optical model that are allowed to vary.

4. The method of claim 1, further comprising determining a relationship between the one or more characteristics and the nominal and one or more different values, measuring the structure as formed on the wafer using an optical measurement technique, using results of the measuring to determine the one or more characteristics of the structure as formed on the wafer, and determining values of the process parameters used to form the structure on the wafer using the one or more determined characteristics in combination with the relationship.

5. The method of claim 1, wherein both simulating steps comprise simulating the one or more characteristics as a function of position across the structure, and wherein the initial model and the optical model are created to include mathematical functions that define variations in at least some of the one or more characteristics as a function of the position across the structure.

6. The method of claim 1, further comprising simulating results of optical measurements of the structure that would be formed on the wafer using the nominal values and the one or more different values and determining which parameters of the optical measurements are more sensitive to changes in values of the process parameters than other parameters of the optical measurements.

7. The method of claim 6, further comprising determining the parameters of the optical measurements that will be used to measure the structure as formed on the wafer based on the parameters of the optical measurements that are more sensitive to the changes in the values of the process parameters than the other parameters of the optical measurements.

8. The method of claim 1, further comprising generating a library of optical scatterometry signatures based on the one or more characteristics of the structure that would be formed on the wafer using the nominal values and the one or more different values.

9. The method of claim 8, wherein the one or more different values comprise maximum and minimum values for one of the process parameters.

10. The method of claim 8, wherein generating the library comprises storing the optical scatterometry signatures calculated for the nominal values and the one or more different values.

11. The method of claim 8, wherein generating the library comprises training software on the optical scatterometry signatures calculated for the nominal values and the one or more different values.

12. The method of claim 8, wherein generating the vary is performed without measuring the structure as formed on any wafers.

13. The method of claim 1, further comprising determining one or more characteristics of the structure as formed on a wafer using an optical measuring technique and determining one or more values of one or more of the process parameters used to form the structure on the wafer based on the one or more characteristics of the structure as formed on the wafer.

14. The method of claim 13, further comprising altering one or more parameters of a process tool based on the one or more determined values of the one or more of the process parameters.

15. The method of claim 1, further comprising determining one or more characteristics of the structure as formed on a wafer using an optical measuring technique and determining one or more characteristics of a device that will be formed on the wafer and that will include the structure based on the one or more characteristics of the structure as formed on the wafer.

16. The method of claim 1, further comprising determining one or more characteristics of the structure as formed on a wafer using an optical measuring technique, determining one or more values of one or more of the process parameters used to form the structure on the wafer based on the one or more characteristics of the structure as formed on the wafer, and determining one or more characteristics of a device that will be formed on the wafer and that will include the structure based on the one or more determined values of the one or more of the process parameters.

17. The method of claim 1, further comprising determining two or more characteristics of the structure as formed on a wafer using an optical measuring technique, determining one or more characteristics of a device that will be formed on the wafer and that will include the structure based on a combination of the two or more characteristics of the structure as formed on the wafer, and determining if the one or more characteristics of the device will be out of specification for the one or more characteristics of the device.

18. The method of claim 1, further comprising simulating, using results of both of the simulating steps and a first model, one or more characteristics of a device that will be formed on the wafer using the nominal and one or more different values of the process parameters and that will include the structure and generating a second model that is simpler than the first model and that describes the one or more characteristics of the device as a function of the results of both of the simulating steps.

19. The method of claim 1, further comprising generating a test structure design based on results of both of the simulating steps such that one or more characteristics of a test structure as formed on the wafer in accordance with the test structure design are sensitive to changes in values of one or more, but not all, of the process parameters.

20. The method of claim 1, further comprising generating first and second test structure designs based on results of both of the simulating steps such that one or more characteristics of a first test structure as formed on the wafer in accordance with the first test structure design are sensitive to a first of die process parameters but not a second of the process parameters and such that one or more characteristics of a second test structure as formed on the wafer in accordance with the second test structure design are sensitive to the second of the process parameters but not the first of the process parameters.

21. The method of claim 1, further comprising generating a test structure design based on results of both of the simulating steps such that optical measurements of one or more characteristics of a test structure formed on the wafer in accordance with the test structure design are sensitive to changes in the one or more characteristics of the test structure.

22. A non-transitory computer-readable medium storing program instructions executable on a computer system for performing a computer-implemented method for generating an optical model of a structure to be measured on a semiconductor wafer, wherein the computer-implemented method comprises:

selecting nominal values and one or more different values of process parameters for one or more process steps used to form the structure on the wafer;

simulating one or more characteristics of the structure that would be formed on the wafer using the nominal values;

generating an initial model of the structure based on results of said simulating;

simulating the one or more characteristics of the structure that would be formed on the wafer using the one or more different values as input to the initial model;

translating results of both of the simulating steps into the optical model of the structure; and determining parameterization of the optical model based on how the one or more characteristics of the structure vary between at least two of the nominal values and the one or more different values, wherein the selecting step, both simulating steps, the generating step, the translating step, and the determining step are performed without using images of the structure as formed on a wafer and before the structure is formed on any wafers.

23. A system configured to generate an optical model of a structure to be measured on a semiconductor wafer, comprising:

an optical measurement subsystem configured to measure the structure as formed on the wafer; and a computer subsystem configured for:

selecting nominal values and one or more different values of process parameters for one or more process steps used to form the structure on the wafer;

simulating one or more characteristics of the structure that would be formed on the wafer using the nominal values;

generating an initial model of the structure based on results of said simulating;

simulating the one or more characteristics of the structure that would be formed on the wafer using the one or more different values as input to the initial model;

translating results of both of the simulating steps into the optical model of the structure; and determining parameterization of the optical model based on how the one or more characteristics of the structure vary between at least two of the nominal values and the one or more different values, wherein the selecting step, both simulating steps, the generating step, the translating step, and the determining step are performed without using images of the structure as formed on a wafer and before the structure is formed on any wafers.

* * * * *